Jan. 5, 1960 M. E. LATTMANN 2,919,850
TARGET TRACKING COMPUTING DEVICE
Filed Oct. 20, 1952 9 Sheets-Sheet 1
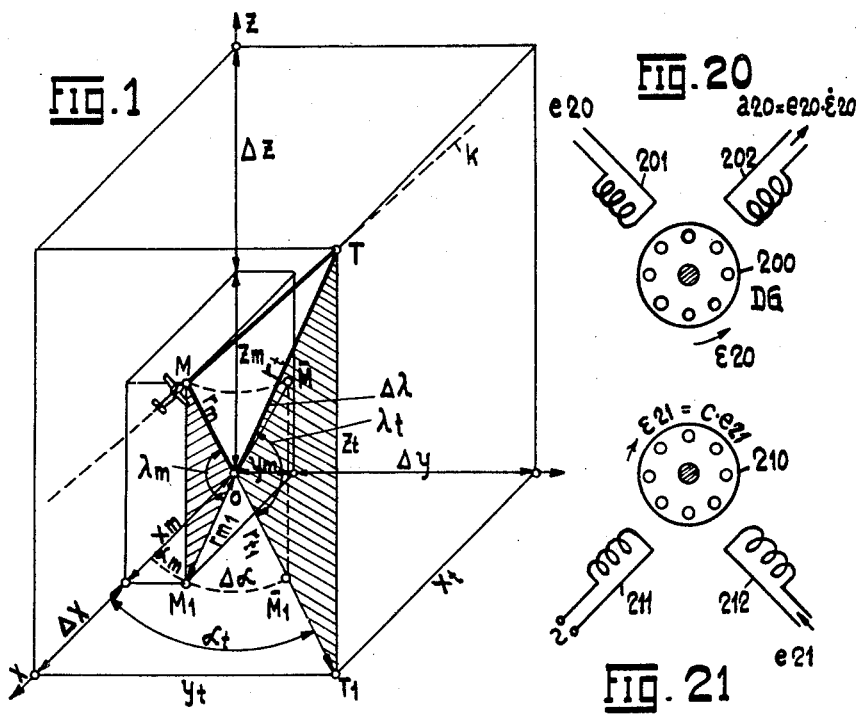
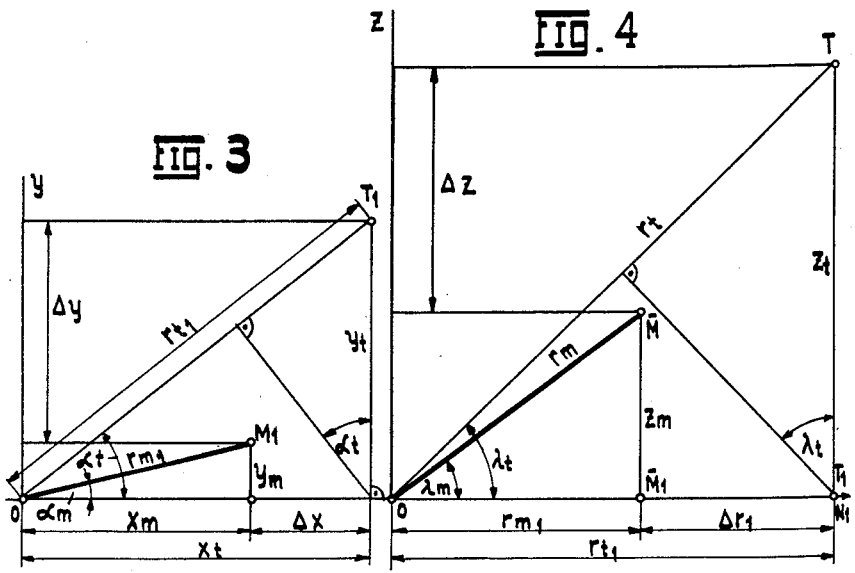
INVENTOR:
MAX E. LATTMANN
By: Michael S. Striker
Agt.

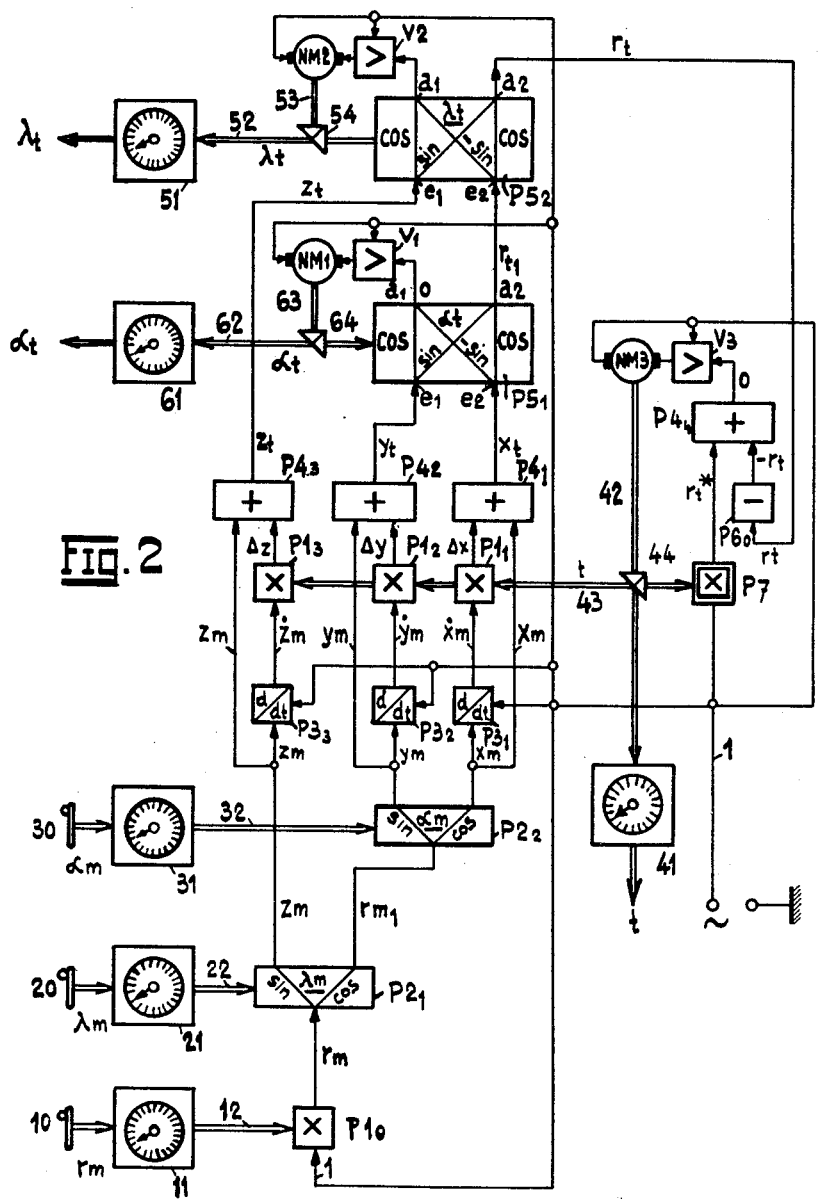

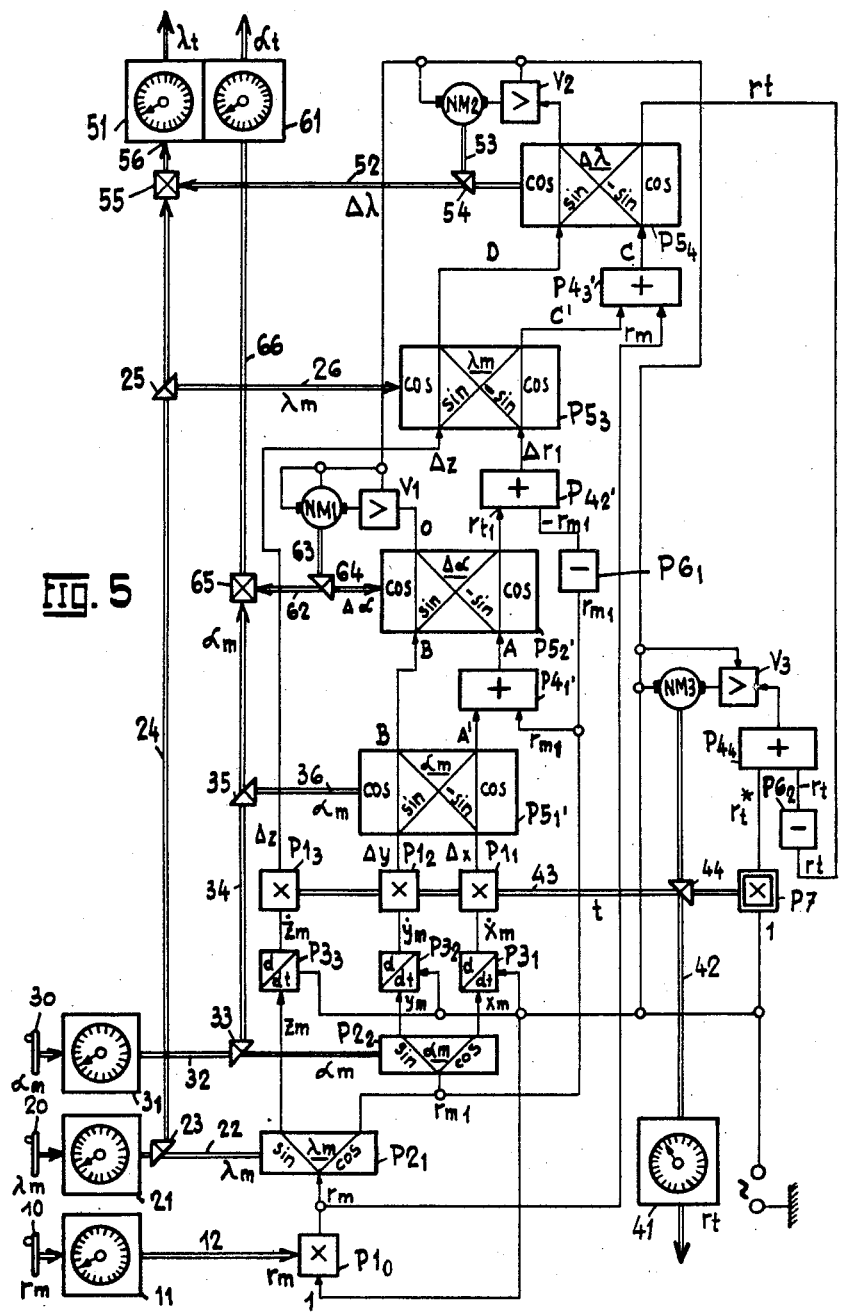

INVENTOR:
MAX E. LATTMANN
By: Michael S. Striker
agt.

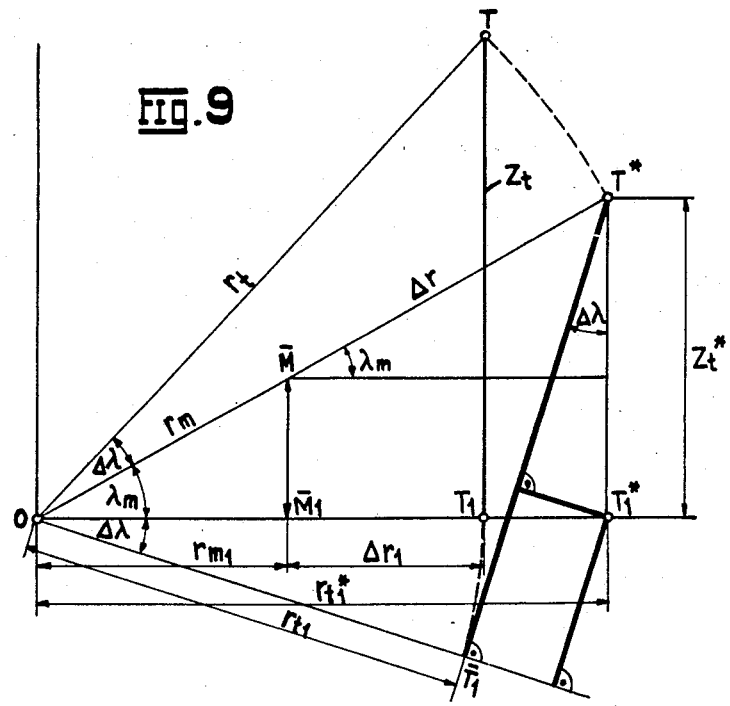
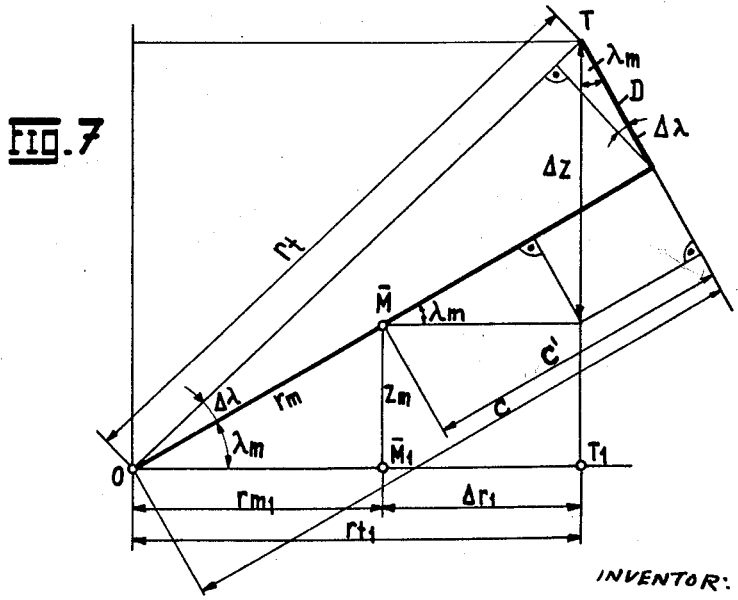

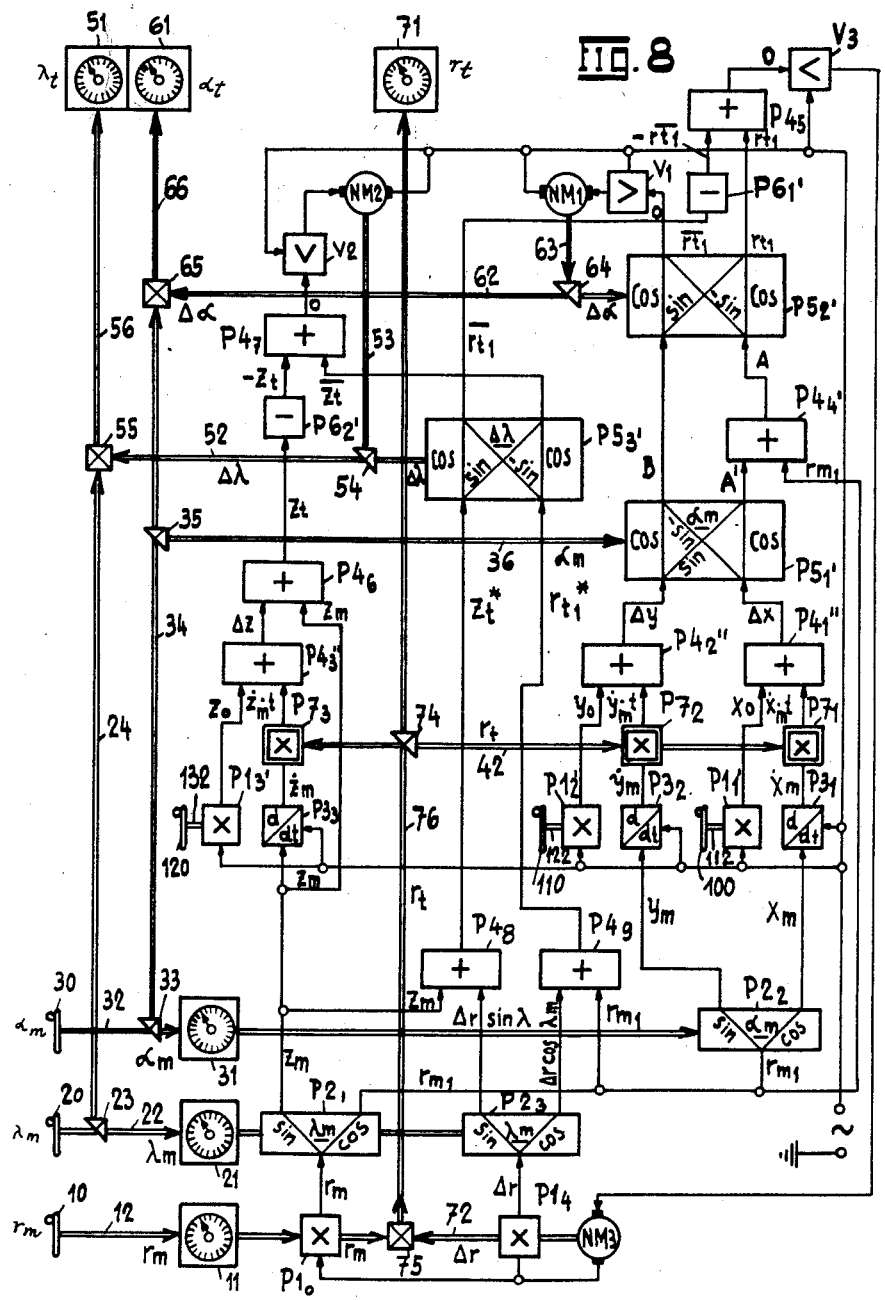

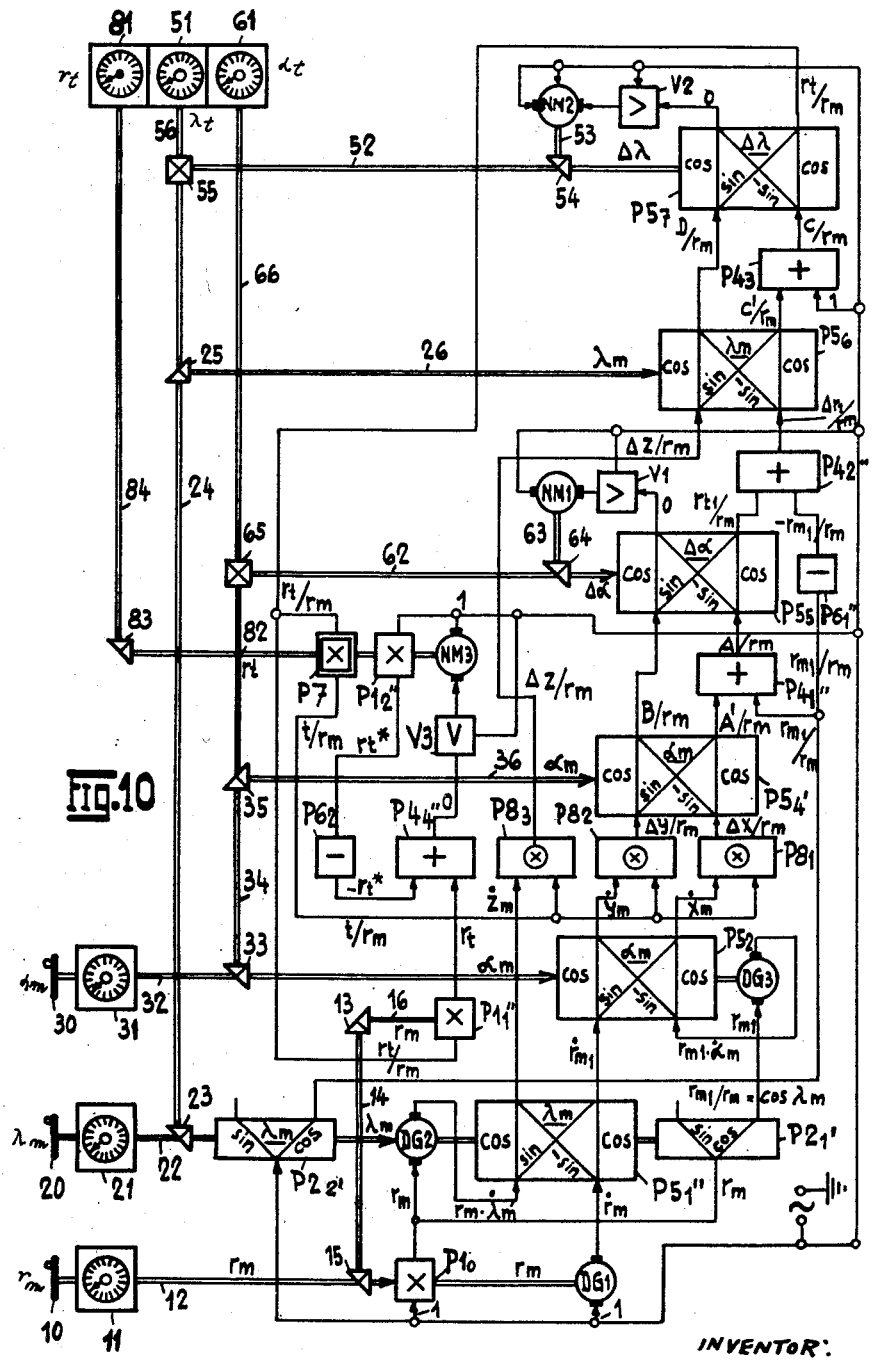

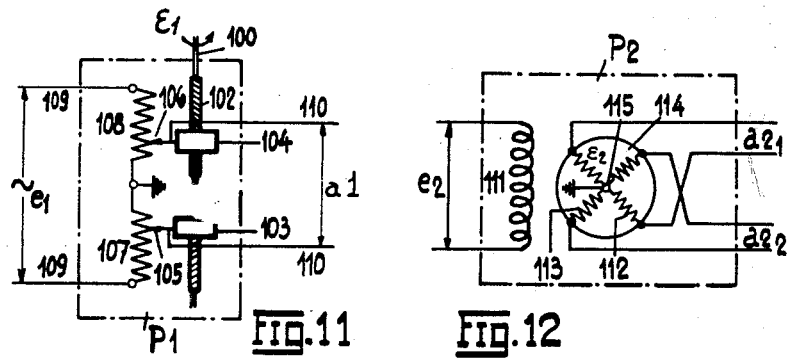
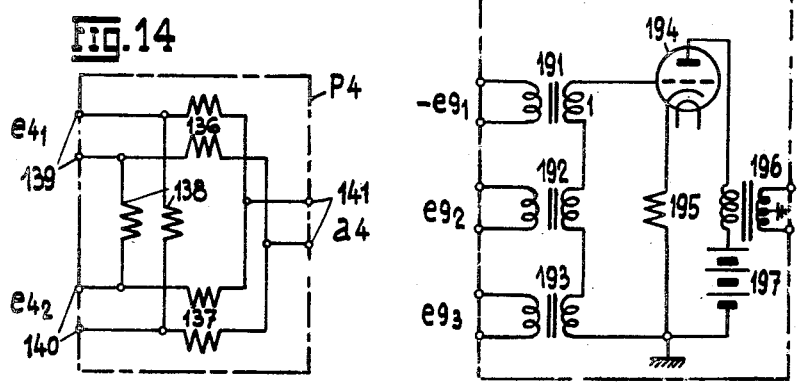
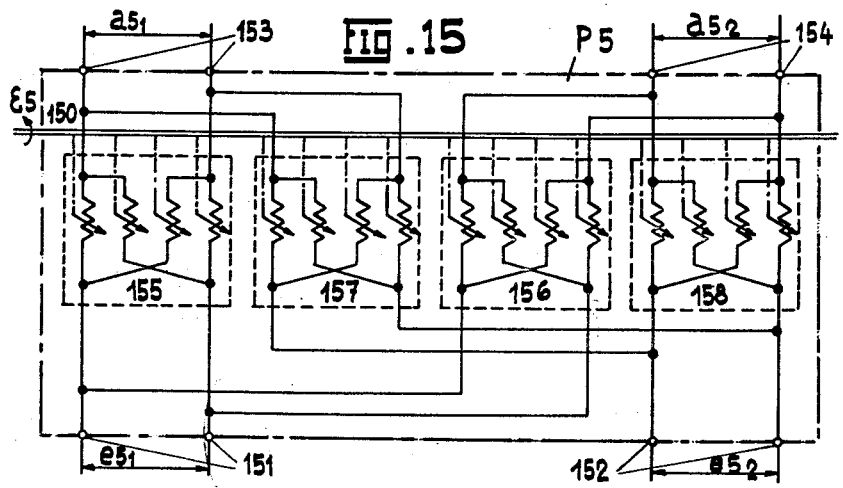

United States Patent Office 2,919,850
Patented Jan. 5, 1960

2,919,850

TARGET TRACKING COMPUTING DEVICE

Max E. Lattmann, Zurich, Switzerland, assignor to Contraves A.G., Zurich, Switzerland, a Swiss company Application October 20, 1952, Serial No. 315,615

Claims priority, application Switzerland October 20, 1951

18 Claims. (Cl. 235—61.5)

The present invention relates to a device for the automatic determination of the polar coordinates namely the polar distance $r_t$, the angle of elevation $\lambda_t$ and the azimuth angle $\alpha_t$ of a striking point T of a target point M moving on a trajectory in space, on which point a projectile fired towards this point should arrive simultaneously with the said target point M.

By the aid of an aiming device which for example comprises a range finder and a theodolite the polar coordinates of the target point M in relation to a stationary observation point which continuously vary in time are currently measured viz. the polar distance $r_m$, the azimuth angle $\alpha_m$ and the angle of elevation $\lambda_m$ of said target point M.

It is the main object of the invention to provide a device of the kind referred to which from the said currently measured polar coordinates of the said target point M automatically determines the polar coordinates of the said striking point T with an improved accuracy. Now the accuracy of calculation of an electric computing member corresponds at the best to the accuracy at which the individual elements of a computing member can be adjusted, viz. resistances, capacities and inductances. On the other hand it will be readily realized that, when ascertaining a value the magnitude of which may vary within a comparatively large range, a certain relative error may cause a larger absolute error than when ascertaining a value which can assume small magnitudes only.

Since when ascertaining the aforesaid coordinates of a striking point the values of the deviation angles $\Delta\lambda=\lambda_t-\lambda_m$ and $\Delta\alpha=\alpha_t-\alpha_m$ can be merely of comparatively small magnitude as compared with the values of the actual coordinates $\lambda_t$, $\lambda_m$, $\alpha_t$, $\alpha_m$, it is an object of the invention to provide a device for the determination of coordinates in which instead of the magnitudes of the coordinates $\lambda_t$, $\alpha_t$ the corresponding deviations $\Delta\lambda$ and $\Delta\alpha$ are ascertained which magnitudes can be ascertained with correspondingly higher accuracy.

With these and other objects in view I provide according to the invention a device for automatically ascertaining the polar coordinates namely polar distance $r_t$, angle of elevation $\lambda_t$ and azimuth angle $\alpha_t$ of a striking point T on the trajectory of a target point M moving in space on which striking point a projectile is to arrive simultaneously with the said target point M, comprising in combination: three adjustment shafts currently adjusted respectively to the polar distance $r_m$, angle of elevation $\lambda_m$ and azimuth angle $\alpha_m$ of the said target point; a first group of electrical computing members electrically interconnected and each operatively connected to one of the said adjustment shafts, the said computing members generating output voltages proportional to the Cartesian velocity components $\dot{x}_m$, $\dot{y}_m$, $\dot{z}_m$, respectively of the said target point M in a stationary Cartesian coordinate system; a second group of electrical computing members in electrical connection with the computing members of the said first group and supplied by them with their output voltages, respectively; a fourth adjustment shaft angularly responsive to the flying time $t$ of the projectile operatively connected to all computing members of the said second group whereby the said computing members of the second group multiply the said velocity components by the said flying time and generate output voltages proportional to the Cartesian deviation components $\Delta x = \dot{x}_m \cdot t$, $\Delta y = \dot{y}_m \cdot t$ and $\Delta z = \dot{z}_m \cdot t$, respectively, of the said striking point T with respect to the said target point M; a third group of electrical computing members in electrical connection with those of the said second group and supplied with the output voltages thereof; control shafts operatively connected to the computing members of the said third group and geared to the said adjustment shafts responsive to the azimuth angle $\alpha_m$ and angle of elevation $\lambda_m$ of the said target point M; sources of comparative voltages; follow-up motors electrically connected to such sources of comparative voltages and to the output of computing members of the said third group, said follow-up motors rotating responsive to the sign and magnitude of the differences between output voltages of such computing members of the third group and such comparative voltages and being geared each to one of the said control shafts and adjusting the same to an angular position proportional to the azimuth deviation angle $\Delta\alpha = \alpha_t - \alpha_m$, the deviation $\Delta\lambda = \lambda_t - \lambda_m$ of the angle of elevation of the striking point T with respect to those of the target point M, and to the polar distance $r_t$ of said striking point T, respectively, the said control shaft responsive to the polar distance $r_t$ being geared to the said fourth adjustment shaft whereby the said fourth adjustment shaft is made angularly responsive to the flying time $t$, the latter being proportional to the said polar distance $r_t$.

A further improvement of the accuracy attainable can be achieved thereby that, instead of voltages which are proportional to the individual magnitudes used in the course of the computation, voltages are used, which are related to a unit distance $r_m=1$, i.e. voltages which can vary within comparatively small ranges of magnitude only.

In order that the invention may be better understood and readily carried into effect, some embodiments thereof will now be explained by way of example with reference to the accompanying drawings, in which:

Fig. 1 shows the movement of a target M towards a striking point T, and the associated magnitudes of the polar coordinates in relation to the zero point O of a Cartesian coordinate system.

Fig. 2 shows a device for the determination of coordinates of a simple kind which does not conform with the principles of the invention in a diagrammatic representation.

Figs. 3 and 4 are two auxiliary figures for the explanation of the mathematical relations used in the example of Fig. 2.

Fig. 5 shows a first embodiment of the invention in a diagrammatic representation.

Figs. 6 and 7 are two auxiliary figures for the explanation of the mathematical relations used in the embodiment according to Fig. 5.

Fig. 8 shows another embodiment of the invention in a diagrammatic representation.

Fig. 9 is an auxiliary figure for the explanation of the mathematical relations according to which the embodiment of Fig. 5 operates.

Fig. 10 is a further embodiment of the invention in a diagrammatic representation.

Fig. 11 shows the internal construction of a linear multiplying member P1 adjusted by a shaft, as used in the Figs. 2, 5, 8 and 10.

Fig. 12 shows the construction of a component analyser P2 as used in the Figs. 2, 5, 8 and 10.

Fig. 14 shows the internal construction of an addition member P4 as used in the Figs. 2, 5, 8 and 10.

Fig. 15 shows the internal construction of an eight-pole resolving means P5 which may be used in all the various embodiments.

Fig. 19 shows a combination member which performs several computation operations at the same time.

Fig. 20 shows an embodiment of a tachometer-generator DG as used in the embodiment of Fig. 10.

Fig. 21 shows the construction of a follow-up motor NM as used in all the embodiments according to the invention.

Figure 6:
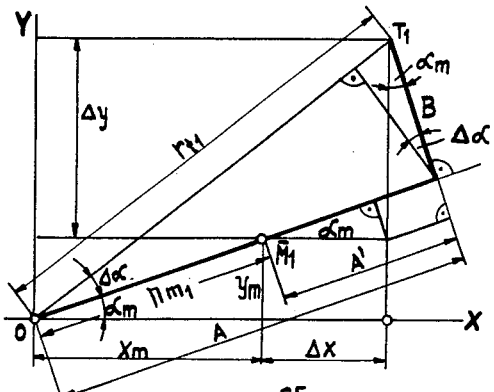

In the geometric Figs. 3, 4, 6, 7 and 9, right angles between constructed lines are indicated by an arc between the lines and a dot within the arc.

According to Fig. 1 the assumption is made that from the zero point O of a Cartesian coordinate system the movements of an aircraft on a trajectory $k$ is followed by means of an aiming device. The actual locus of the aircraft is denoted M, the predetermined striking point is denoted T. The vector $r_m = OM$ the length of which is measured by a range finder is projected on to the base plane $x.y$ and the projection there has the length $r_{m1} = OM_1$. The angle $MOM_1$ is the angle of elevation $\lambda_m$ of the target, while the angle $XOM_1$ is the azimuth angle $\alpha_m$ of the target point M. The striking point T has the polar coordinates $r_t = OT$, $\lambda_t = TOT_1$ and $\alpha_t = XOT_1$. Likewise, the locus coordinates $x_m$, $y_m$, $z_m$ denote the coordinates of the target point M in the Cartesian coordinates system X, Y, Z and $x_t$, $y_t$, $z_t$ those of the striking point T in this coordinate system, the deviation components being denoted $\Delta_x = x_t - x_m$, $\Delta_y = y_t - y_m$ and $\Delta_z = z_t - z_m$. Moreover it is indicated how the plane $MOM_1$ can be folded into the plane $TOT_1$ wherefrom the points M and $M_1$ and the difference angles $\Delta\lambda = \lambda_t - \lambda_m$ and $\Delta\alpha = \alpha_t - \alpha_m$ result.

In the device according to Fig. 2 the currently measured coordinates $r_m$, $\lambda_m$, and $\alpha_m$ are transferred on to the shafts 12, 22 and 32 by means of the hand cranks 10, 20 and 30, respectively, the reading dials 11, 21, 31 respectively making the magnitudes adjusted visible at any time.

By the aid of a multiplication member $P1_0$ which is adjusted by the shaft 12 as a function of the distance value $r_m$, the internal construction of which member will be explained later in the specification with reference to Fig. 11 of the drawing, a voltage $r_m$ is generated from an input voltage 1 derived from the A.C. mains, which is always proportionals to the momentary distance OM of the target M from the zero point O of the coordinate system.

This voltage $r_m$ is supplied to the component analyser $P2_1$ which is adjusted by the shaft 22 in dependence of the angle of elevation $\lambda_m$, and the internal construction of which will be explained later with reference to Fig. 12. It resolves the voltage $r_m$ supplied to it into the components $z_m$ and $r_{m1}$ according to the following components:

$$z_m = r_m . \sin \lambda_m \qquad (1)$$

$$r_m 1 = r_m . \cos \lambda_m \qquad (2)$$

The voltage $r_{m1}$ is supplied to a second component analyser $P2_2$ which is adjusted by the shaft 32, in dependence of the azimuth angle $\alpha_m$, and resolves the same into the components $y_m$ and $x_m$ according to the following equations:

$$y_m = r_{m1} . \sin \alpha_m \qquad (3)$$

$$x_m = r_{m1} . \cos \alpha_m \qquad (4)$$

Each of the voltages $x_m$, $y_m$ and $z_m$ is fed into a differentiation member $P3_1$, $P3_2$, $P3_3$, respectively which will be explained later in detail with reference to Fig. 13, and which differentiates the voltage supplied to it with respect to time so that the velocity components $v_{xm}$, $v_{ym}$, $v_{zm}$ of the target point M in relation to the stationary Cartesian coordinate system result according to the following equations:

$$v_{xm} = \dot{x}_m = \frac{dx}{dt} \qquad (5)$$

$$v_{ym} = \dot{y}_m = \frac{dy}{dt} \qquad (6)$$

$$v_{zm} = \dot{z}_m = \frac{dz}{dt} \qquad (7)$$

Each of these velocity components is multiplied by a time value $t$ by the aid of a multiplication member $P1_1$, $P1_2$, $P1_3$, respectively, adjusted by the shaft 43 in function of said time value $t$. This time value $t$ is assumed to correspond to the flying time of a projectile from the zero point O of the coordinate system to the striking point T. The following equations result:

$$\Delta_x = \dot{x}.t \qquad (8)$$

$$\Delta_y = \dot{y}.t \qquad (9)$$

$$\Delta_z = \dot{z}.t \qquad (10)$$

The voltage derived therefrom comply with the conditions:

$$\Delta x = x_t - x_m \qquad (8a)$$

$$\Delta y = y_t - y_m \qquad (9a)$$

$$\Delta z = z_t - z_m \qquad (10a)$$

i.e. they correspond to the deviation components in the Cartesian coordinate system. By means of fixedly adjusted addition members $P4_1$, $P4_2$, $P4_3$, respectively, the internal construction of which will be explained with reference to Fig. 14, the voltages $x_m$, $y_m$, $z_m$ are added to the deviation components $\Delta x$, $\Delta y$, $\Delta z$, respectively so that the coordinates of the striking point $x_t$, $y_t$, $z_t$ in the Cartesian coordinate system result according to the following equations:

$$x_t = x_m + \Delta x \qquad (11)$$

$$y_t = y_m + \Delta y \qquad (12)$$

$$z_t = z_m + \Delta z \qquad (13)$$

The voltages $x_t$ and $y_t$ are supplied as input values $e_1$ and $e_2$ to a resolving member $P5_1$ which is constructed as an eightpole and which will be explained later with reference to the Figs. 15 and 16. It is adjusted by a shaft 62 as a function of an angle $\epsilon = \alpha_1$. It generates two voltages which correspond to the following equations:

$$a_1 = e_1 . \cos \epsilon - e_2 . \sin \epsilon \qquad (14)$$

$$a_2 = e_1 . \sin \epsilon - e_2 . \cos \epsilon \qquad (15)$$

From Fig. 3 the following relations can be easily read off:

$$y_t . \cos \alpha_t - x_t . \sin \alpha_t = 0 \qquad (14a)$$

$$y_t . \sin \alpha_t + x_t . \cos \alpha_t = r_{t1} \qquad (15a)$$

These two equations completely correspond to the Equations 14 and 15, respectively. That angle $\alpha_t$ for which the zero-condition of Equation 14a is fulfilled, is the azimuth angle desired of the striking point T.

The voltage $a_1$ according to the Equation 14 is accordingly supplied via an amplifier $V_1$ to a follow-up motor $NM_1$ the shaft 63 of which is geared to a shaft 62 by means of a bevel gearing 64 which controls the said transformation eightpole $P5_1$. The said follow-up motor $NM_1$ rotates as long as the voltage $a_1$ is not zero. The angular position of the shaft 62 resulting therefrom accordingly corresponds to the desired azimuth angle $\alpha_t$.

With this adjustment of the transformation eightpole $P5_1$ the voltage $a_2$ corresponds, according to the Equation 15a to the value of $r_{t1}$, i.e. to the projection of the vector OT of the striking point on to the base plane x.y.

The voltage values $z_t$ and $r_{t1}$ are then supplied as input voltages $e_1$ and $e_2$ to a second transformation eightpole $P5_2$. From Fig. 4 of the drawing the following relations can be easily read off:

$$z_t.\cos \lambda_t - r_{t1}.\sin \lambda_t = 0 \quad (14b)$$

$$z_t.\sin \lambda_t + r_{t1}.\cos \lambda_t = r_t \quad (15b)$$

The first output voltage (Equation 14b) is supplied via an amplifier $V_2$ to a follow-up motor $NM_2$, the shaft 53 of which adjusts through a bevel gearing 54 the shaft 52 controlling the associated transformation eight-pole $P5_2$ in such a manner, that the Condition 14b is fulfilled and that the angular position of the said shaft 52 corresponds to the angle of elevation $\lambda_t$ desired.

According to Equation 15b the voltage $a_2$ of this computing network corresponds then to the value $OT = r_t$.

A follow-up motor $NM_3$ receives its voltage of excitation from an amplifier $V_3$ the input of which is connected to the output of an addition member $P4_4$. This addition member $P4_4$ is supplied with two voltages, one of which corresponds to a value $-r_t$ which is obtained thereby that the voltage $r_t$ is turned 180° in phase by means of a phase reversing member $P6_0$.

The other one of the said voltages is derived from a non-linear multiplication member $P7$ which is controlled by a shaft 43 the angular position of which has to correspond to the aforesaid time value $t$. It contains variable resistances of such magnitudes, that the output voltage corresponds to the value $$r_t^* = r_t(t)$$

i.e. for any time value $t$ as adjusted by the shaft 43 the voltage $$r_t^*$$

has to correspond to the corresponding distance of flight of the projectile. This output voltage $$r_t^*$$

represents accordingly likewise a measure for a magnitude of distance, and has to be equal to the magnitude $r_t$ in order that the time value $t$ may be correct.

The voltage difference $$r_t^* - r_t \quad (16)$$

has to be equalized to zero, and the follow-up motor $NM_3$ the shaft 42 of which is geared to the shaft 42 by means of the bevel gearing 44, automatically performs this task.

The angular position of the shaft 42 is accordingly a measure of the time value $t$ and consequently also of the firing range $r_t$, while the angular positions of the shafts 52 and 62 correspond to the angles $\lambda_t$ and $\alpha_t$, respectively.

The desired values $r_t$, $\lambda_t$, $\alpha_t$ can accordingly be read off on the dials of the instruments 41, 51, 61, respectively, whereby the problem would be solved.

A substantial disadvantage of this embodiment of a device for the determination of coordinates consists, however, in that values of $\alpha_t$ and $\lambda_t$, which may vary over a wide range of magnitudes, are determined directly so that the shafts 62 and 52 may have to turn through a full range of 360° or 90°, respectively. Unavoidable relative inaccuracies of the computing members $P5_1$ and $P5_2$ may accordingly involve correspondingly high absolute errors in the magnitudes $\alpha_t$ and $\lambda_t$ determined by them. These errors become substantially smaller in the embodiment according to Fig. 5 (in which analogous parts carry the same reference symbols as those in Fig. 2) to which are associated the auxiliary Figs. 6 and 7.

From the currently measured coordinates of the target point $r_m$, $\lambda_m$, $\alpha_m$, which are likewise transmitted via the cranks 10, 20, 30 to the shafts 12, 22, 32, respectively, the values $r_m$, $r_{m1}$, $x_m$, $y_m$, $z_m$, $\dot{x}_m$, $\dot{y}_m$, $\dot{z}_m$, are derived in this embodiment as voltage magnitudes by the aid of multiplication members $F1_0$, component analysers $P2_1$, $P2_2$ and differentiation members $P3_1$, $P3_2$, $P3_3$ in exactly the same way as in the embodiment according to Fig. 2. The voltages $\dot{x}_m$, $\dot{y}_m$, $\dot{z}_m$ are likewise multiplied in the same manner as according to Fig. 2 with a time value $t$ by the aid of multiplicators $P1_1$, $P1_2$, $P1_3$, respectively, which are controlled by a shaft 43 common to them, in function of the said time value $t$, so that the values $\Delta x$, $\Delta y$ and $\Delta z$ are obtained according to the Equations 8, 9 and 10, respectively.

From Fig. 6 the following relations can be easily read off:

$$B = \Delta y.\cos \alpha_m - \Delta x.\sin \alpha_m \quad (17)$$

$$A' = \Delta y.\sin \alpha_m + \Delta x.\cos \alpha_m \quad (18)$$

$$A = A' + r_{m1} \quad (19)$$

The Equations 17 and 18 can be solved by means of a transformation member $P5_1'$, the shaft 36 of which is geared to the shaft 32 via the bevel gearing 35, the shaft 34 and the level gearing 33, i.e. in dependence of the angle $\alpha_m$. The Equation 19 is solved by the aid of an addition member $P4_1'$ to which the voltages $A'$ and $r_{m1}$ are supplied.

From Fig. 6 moreover the following relations can be easily read off:

$$B.\cos \Delta\alpha - A.\sin \Delta\alpha = 0 \quad (20)$$

$$B.\sin \Delta\alpha + A.\cos \Delta\alpha = r_{t1} \quad (21)$$

These equations corerspond to the Equations 14 and 15 and accordingly can be likewise solved by a resolving member $P5_2'$, one output voltage of which, that corresponds to Equation 20, is supplied via an amplifier $V_1$ to a follow-up motor $NM_1$. The shaft 63 of this motor, which is geared to the shaft 62 through a bevel gearing 64, will accordingly assume an angular position, which corresponds to the angle difference $\Delta\alpha$. Then the second output voltage 21 of the resolving member $P5_2'$ is a measure of the distance $r_{t1}$. The same is supplied to an addition member $P4_2'$ to which is moreover supplied a voltage $-r_{m1}$ which is obtained by the aid of a phase reversing member $P6_1$ by which the value $-r_{m1}$ is derived from the voltage $r_{m1}$. Hence from the following Equation 22 the voltage value $\Delta r_1$ is derived:

$$\Delta r_1 = r_{t1} - r_{m1} \quad (22)$$

From Fig. 7 the following relations are easily read off:

$$D = \Delta z.\cos \lambda_m - \Delta r_1 \sin \lambda_m \quad (23)$$

$$C' = \Delta z.\sin \lambda_m + \Delta r_1 \cos \lambda_m \quad (24)$$

$$C = C' + r_m \quad (25)$$

The Equations 23 and 24 can be solved by means of a resolving member $P5_3$ which is controlled by the shaft 26, which is adjusted via bevel gearing 25, shaft 24 and bevel gearing 23 in accordance with the value $\lambda_m$.

The Equation 25 is solved by an addition member $P4_3'$ to which the voltages $C'$ and $r_m$ are supplied.

From Fig. 7 moreover the following relations result:

$$D.\cos \Delta\lambda - C.\sin \Delta\lambda = 0 \quad (26)$$

$$D.\sin \Delta\lambda + C.\cos \Delta\lambda = r_t \quad (27)$$

These equations are solved by the aid of an eight-pole resolving member $P5_4$ which is controlled by the shaft 52 in dependence of a desired value $\Delta\lambda$. The voltage according to Equation 26 is supplied via an amplifier $V_2$ to a follow-up motor $NM_2$ the shaft 53 of which is geared via a bevel gearing 54 to the shaft 52, and accordingly adjusts this shaft 52 automatically so that Equation 26 is fulfilled.

The voltage $r_t$ according to Equation 27 corresponds to the value OT, i.e. to the shooting range, and by the aid of multiplication member P7, which solves the ballistic equation $$\overset{*}{r}_t = f(t)$$

phase reversing member $P6_2$, addition member $P4_4$, amplifier $V_3$ and of a follow-up motor $NM_3$, the control shaft 43 can be adjusted, exactly in the same manner as according to Fig. 2, so that the relation 16 is fulfilled. The motor shaft is for this purpose likewise geared by a bevel gearing 44 to the shaft 43 which controls the ballistic multiplication member P7 in accordance with the time value $t$.

On the dial of the instrument 41 the distance value $r_t$ can be read off.

The angular magnitude $\Delta\lambda$ as adjusted on the shaft 52 is added to the value $\lambda_m$ by means of a summing mechanism 55 into which enters also the shaft 24, so that on the shaft 56 the value $\lambda_t = \lambda_m + \Delta\lambda$ is adjusted, which can be read off on the dial of instrument 51.

In the same manner the turning angle $\Delta\lambda$ which is adjusted on the shaft 62 is added to the turning angle $\alpha_m$ of the shaft 34 by the aid of a summing mechanisms 65 so that on the shaft 66 the angle $\alpha_t = \alpha_m + \Delta\alpha$ is adjusted which can be read off on the dial of the instrument 61.

Since instead of the values $\alpha_t$ and $\lambda_t$ the deviation values $\Delta\alpha$ and $\Delta\lambda$ are determined, the resulting absolute errors can be kept sufficiently small at a reasonable expense as regards the construction of the eight-poles $P5_1'$, $P5_2'$, $P5_3$, $P5_4$.

Apart from the fact that the embodiment according to Fig. 8, in conjunction with which the auxiliary Fig. 9 has to be contemplated, is based on a somewhat different method of calculation than the embodiment of Fig. 5, also the fact is taken into consideration in Fig. 8 that often the gun emplacement does not coincide with the observation point O, but has the parallax components $x_0$, $y_0$, $z_0$ in relation to the Cartesian coordinate system $x$, $y$, $z$. As will be realized without much explanation, the deviation components are in this case determined by the following equations:

$$x = \dot{x}_m \cdot t + x_0 \quad (8a)$$
$$y = \dot{y}_m \cdot t + y_0 \quad (9a)$$
$$z = \dot{z}_m \cdot t + z_0 \quad (10a)$$

The ascertaining of the voltage values $\dot{x}_m \cdot t$, $\dot{y}_m \cdot t$ and $\dot{z}_m \cdot t$ is carried out according to this embodiment in exactly the same way as in the embodiments according to the Figs. 2 and 5 by the aid of multiplication members $P1_0$, component analysers $P2_1$, $P2_2$ and differentiation members $P3_1$, $P3_2$, $P3_3$, respectively with the use of shafts 12, 22, and 32 adjusted by the cranks 10, 20, 30 as control shafts for the members $P1_0$, $P2_1$ and $P2_2$. For the formation of the voltage components $\dot{x}_m \cdot t$, $\dot{y}_m \cdot t$ and $\dot{z}_m \cdot t$ from the values $\dot{x}_m$, $\dot{y}_m$, $\dot{z}_m$, respectively, ballistic multiplication members $P7_1$, $P7_2$ and $P7_3$, respectively, are used, which are controlled by a shaft 42' the rotation angle of which corresponds to a distance $r_t$, and the resistance of which members are varied in accordance with the function $t(r_t)$ so that the voltage supplied to these members $P7_1$, $P7_2$, $P7_3$ are multiplied for each angular position of shaft 42' with the time value of the flight of the projectile to the striking point associated with the value $r_t$. The Equations 8a, 9a and 9b are solved by the aid of addition members $P4_1''$, $P4_2''$, $P4_3''$, to which are supplied the voltages $\dot{x}_m \cdot t$, $\dot{y}_m \cdot t$ and $\dot{z}_m \cdot t$, respectively, as well as the voltages $x_0$, $y_0$, $z_0$, respectively. These voltages are generated by the aid of multiplication members $P1_1'$, $P1_2'$ and $P1_3'$, the shafts 112, 122, 132 of which are controlled by separate cranks 100, 110, 120, respectively, in dependence of the fixed parallax values $x_0$, $y_0$, $z_0$, respectively.

From the voltages $\Delta y$, $\Delta z$, B and A' are derived in the same way as according to Fig. 7 by means of an eight pole resolving member $P5_1$.

An addition member $P4_4'$ solves the Equation 19 and a second eight-pole resolving member $P5_2$ solves the Equations 20, 21 in cooperation with a follow-up motor $NM_1$, so that the angular position of the shaft 62 corresponds to the value $\Delta\alpha$ and a voltage $r_{t1}$ is arrived at.

For further calculation reference will be made firstly to Fig. 9 the plane of drawing of which corresponds to the plane $OTT_1$ of Fig. 1.

To the value $r_m$, a value $\Delta r$ is to be added which extends in the same direction, in accordance with the following equation:

$$OT^* = \overline{OM} + \Delta r = r_m + \Delta r = r_t \quad (28)$$

From this Fig. 9 one can easily read off:

$$z_t^* = z_m + \Delta r \cdot \sin \lambda_m \quad (29)$$
$$r_t^* = OT_1^* = r_{m1} + \Delta r \cdot \cos \lambda_m \quad (30)$$
$$z_t = TT_1 = \overset{*}{T}\overline{T}_1 = z_t^* \cdot \cos \Delta\lambda + r_t^* \sin \Delta\lambda \quad (31)$$
$$r_{t1} = OT_1 = \overline{OT}_1^* = -z_t^* \cdot \sin \Delta\lambda + r_t^* \cos \Delta\lambda \quad (32)$$

However, these two values $z_t$ and $r_{t1}$ are already defined by the equations $$z_t = z_m + \Delta z \quad (13)$$

and $$r_{t1} = B \sin \Delta\alpha + A \cos \Delta\alpha \quad (21)$$

There are accordingly the following conditions:

$$\text{Equation 31} - \text{Equation 13} = 0 \quad (33)$$
$$\text{Equation 21} - \text{Equation 32} = 0 \quad (32)$$

Returning to Fig. 8, it will be shown how these mathematical relations are realized electrically.

In the axial continuation of the shaft 12, a shaft 72 is driven by a follow-up motor $NM_3'$, the angular position of which shaft has to correspond to the value $\Delta r$ mentioned with reference to Fig. 9. This shaft 72 drives a multiplication member $P1_4$ the output voltage of which has to correspond to the value $\Delta r$. This voltage component is resolved into the values $\Delta r \cdot \sin \lambda_m$ and $\Delta r \cdot \cos \lambda_m$ by the component analyser $P2_3$ which is controlled by the shaft 22.

By the aid of addition members $P4_8$ and $P4_9$ the Equations 29 and 30 are realized, in that the values $z_m = \overline{z}_m$, $r_{m1} = \overline{r}_{m1}$ are available for addition in them.

The Equations 31 and 32 are realized in a resolving member $P5_3'$ the shaft 52 of which indicates by its angular position an angle $\Delta\lambda$.

The Equation 13 is realized as in Fig. 2 by an addition member $P4_6$, and the voltage at the output of this addition member is converted by a phase reversing member $P6_2'$ into the value $-z_t$. An addition member $P4_7$ serves for realizing the Condition 33 in that its output voltage is supplied via an amplifier $V_2$ to a follow-up motor $NM_2$ the shaft 53 of which is geared through a bevel gearing 54 to the shaft 52; accordingly the shaft 52 is adjusted to such an angle $\Delta\lambda = \lambda_t - \lambda_m$ that the Condition 33 is fulfilled.

When the Condition 33 is fulfilled, on the second output of the eight-pole resolving member $P5_3$ a voltage $r_{t1}$ is generated in accordance with Equation 32 which in a phase reversing member $P6_1'$ is converted into the value $-r_{t1}$, and is added in an addition member $P4_5$ according to Equation 34 to the value $r_{t1}$ as obtained according to Equation 21. The output voltage of this last mentioned addition member $P4_5$ is supplied via an amplifier $V_3'$ to the follow-up motor $NM_3'$ which accordingly adjusts the shaft 72 automatically to such a value of $\Delta r$ that the Condition 34, too, is fulfilled.

The shafts 12 and 72 are input shafts of a summation mechanism 75 so that the angular positions of the output shaft 76 of the latter corresponds necessarily to the value $r_t = r_m + \Delta r$.

The shaft 76 is geared via a bevel gearing 74 to the shaft 42' the angular position of which accordingly corresponds likewise to the value $r_t$. Consequently the non-linear multiplicators $P7_1$, $P7_2$, $P7_3$, which are controlled by this shaft, can generate from the voltages $\dot{x}_m$, $\dot{y}_m$, $\dot{z}_m$ supplied to them the products $\dot{x}_m \cdot t$, $\dot{y}_m \cdot t$ and $\dot{z}_m \cdot t$, respectively.

On the dial of the instrument 71 which is controlled by the shaft 76, the distance $r_t$ or time $t$ of flight can accordingly be read off.

The shafts 34 and 62 are the input shafts of a summing mechanism 65 the output shaft 66 of which adjusts the instrument 61 in such a manner that the azimuth angle desired, $\alpha_t = \alpha_m + \Delta\alpha$, of the striking point T can be read off its dial.

In the same manner the shafts 24 and 52 are the input shafts of a summing mechanism 55, the output shaft 56 of which adjusts an instrument 51 as a function of the angle of elevation $\lambda_t = \lambda_m + \Delta\lambda$.

The embodiment according to Fig. 10 which represents the most favourable embodiment, is distinguished from the embodiment according to Fig. 5 to which it is closely related, in the following respect:

The velocity components $\dot{x}_m$, $\dot{y}_m$, $\dot{z}_m$, of the target point M are formed in a manner somewhat different from that of Fig. 5. Instead of continuing calculation from this point with the values $\Delta_x$, $\Delta_y$, $\Delta_z$, $r_{m1}$ and $r_m$, values $\Delta x/r_m$, $\Delta y/r_m$, $\Delta z/r_m$, $r_{m1}/r_m$ and 1 are used, i.e. voltages reduced to unit distance $r_m = 1$, the course of the calculation being in principle the same as according to Fig. 5. For the determination of the velocity components $\dot{x}_m$, $\dot{y}_m$ and $\dot{z}_m$ the following equations may be referred to:

$$r_m \cdot \sin \lambda_m = z_m \quad (1)$$
$$\dot{r}_m \cdot \sin \lambda_m + r_m \dot{\lambda}_m \cdot \cos \lambda_m = \dot{z}_m \quad (5a)$$
$$r_m \cdot \cos \lambda_m = r_{m1} \quad (2)$$
$$\dot{r}_m \cdot \cos \lambda_m - r_m \dot{\lambda}_m \cdot \sin \lambda_m = \dot{r}_{m1} \quad (5b)$$
$$r_{m1} \cdot \sin \alpha_m = y_m \quad (3)$$
$$\dot{r}_{m1} \cdot \sin \alpha_m + r_{m1} \dot{\alpha}_m \cdot \cos \alpha_m = \dot{y}_m \quad (6a)$$
$$r_{m1} \cdot \cos \alpha_m = x_m \quad (4)$$
$$\dot{r}_{m1} \cdot \cos \alpha_m - r_{m1} \dot{\alpha}_m \cdot \sin \alpha_m = \dot{x}_m \quad (7a)$$

Accordingly in addition to the values of $r_m$, $\alpha_m$ and $\lambda_m$ those of their derivations with respect to time $$\dot{r}_m, \dot{\alpha}_m \text{ and } \dot{\lambda}_m$$

have to be available.

These derivations can easily be obtained by the aid of Tachometer-Generators $DG_1$, $DG_2$, $DG_3$ to which an input voltage $e$ is supplied, and which are controlled by a shaft in dependence of a value $p$. These Tachometer-Generators will be explained later more in detail with reference to Fig. 20. At present it may be noted that their output voltage corresponds to the value $$e = \dot{p}$$

On the basis of these mathematical relations, Fig. 10 will be easily understood:

The values $r_m$, $\lambda_m$ and $\alpha_m$ are transferred on to the shafts 12, 22, 32 by means of the cranks 10, 20, 30, and indicated on the dials of the instruments 11, 21, 31, respectively.

By the shaft 12, a multiplication member $P1_0$ and a Tachometer-Generator $DG_1$ are controlled. Each of these devices is supplied with unit voltage 1 from the A.C. mains, so that the voltages $$\dot{r}_m$$

and $r_m$ are obtained.

By the shaft 22, the angular position of which corresponds to the angle $\lambda_m$, a Tachometer-Generator $DG_2$, a transformation member $P5_1''$ and two component analysers $P2_1'$ and $P2_2'$ are controlled.

The Tachometer-Generator $DG_2$ forms the voltage $$r_m \cdot \dot{\lambda}_m$$

from the voltage $r_m$ supplied to it. The component analyser $P2_1'$ forms from the voltage $r_m$ the value $r_{m1} = r_m \cdot \cos \lambda_m$, and the other component analyser $P2_2'$ generates from the unit voltage 1 the voltage value $\cos \lambda_m = r_{m1}/r_m$.

The Equations 5a and 5b are realized simultaneously in the transformation member $P5_1$, i.e. the latter produces the output voltages $$\dot{z}_m \text{ and } \dot{r}_{m1}$$

The shaft 32, the angular position of which corresponds the value of $\alpha_m$, controls a transformation member $P5_2''$ and a Tachometer-Generator $DG_3$. The latter produces the voltage $$r_{m1} \cdot \dot{\alpha}_m$$

from the voltage $r_{m1}$ supplied to it, and the transformation member $P5_2''$ realizes simultaneously the Equations 6a and 7a i.e. it generates the voltage values $\dot{y}_m$ and $\dot{x}_m$.

Each one of the voltages $\dot{x}_m$, $\dot{y}_m$, $\dot{z}_m$ is supplied to a computing element $P8_1$, $P8_2$, $P8_3$, respectively, the construction and operation of which will be explained with reference to Fig. 18. A second input voltage supplied to these elements $P8_1$, $P8_2$, $P8_3$ has the value $t/r_m$, in which $t$ is the flight time of the projectile to the striking point T.

The output voltages of these elements have the values $\Delta x/r_m$, $\Delta y/r_m$, $\Delta z/r_m$, respectively.

Henceforth the calculation is continued in the same manner as according to embodiment according to Fig. 5, and moreover like computing elements are used. Thus the transformation member $P5_4'$ is adjusted by the shaft 36 in accordance with the angle $\alpha_m$, this shaft being geared to the shaft 32 via the bevel gearing 35, the shaft 34 and the bevel gearing 33. Since the voltages $\Delta y/r_m$ and $\Delta x/r_m$ are supplied to it, its output voltages have the values $B/r_m$ and $A'/r_m$ according to the Equations 17 and 18. The Equation 19 is realized by the addition member $P4_1$, to which the voltages $A'/r_m$ and $r_{m1}/r_m$ are supplied. The Equations 20 and 21 are realized by the transformation member $P5_5$. The output voltage thereof which corresponds to the Equation 20 and which should assume the value zero is supplied via an amplifier $V_1$ to the follow-up motor $NM_1$, the shaft 63 of which controls the adjustment shaft 62 of the eight-pole $P5_5$ via a bevel gearing 64 in function of the angle $\Delta\alpha$.

The Equation 22 is realized by the addition member $P4_2''$ and the phase reversing member $P6_1''$.

An eight-pole $P5_6$, to which are supplied voltages $\Delta z/r_m$ and $\Delta r_1/r_m$, is controlled by the shaft 26 the angular position of which follows the angle $\lambda_m$, being geared to the shaft 22 via bevel gearing 25, shaft 24 and bevel gearing 23.

This eight-pole resolving member $P5_6$ serves for realizing the Equations 23 and 24 i.e. it produces the voltages $D/r_m$ and $C'/r_m$. To the voltage value $C'/r_m$ a voltage $1 = r_m/r_m$ is added according to the Equation 25 by the addition member $P4_3''$, so that the eight-pole $P5_7$ is supplied with the voltage values $D/r_m$ and $C/r_m$. The said eight-pole $P5_7$ is controlled by a shaft 52 the angular position of which should correspond to the angle $\Delta\lambda$. For this purpose it is geared via the bevel gearing 54 to the shaft 53 of a follow-up motor $NM_2$ which is supplied via the amplifier $V_2$ with a voltage which according to Equation 26 should assume the value zero.

Under these conditions the second output voltage of the eight-pole $P5_7$ has the value $r_t/r_m$. This is supplied to a multiplication member $P1_1''$ which is adjusted by the shaft 16 in accordance with the value $r_m$, this shaft being driven from the shaft 12 via the bevel gearing 13, the shaft 14 and the bevel gearing 15. On the output of the multiplicator $P1_1$ accordingly a voltage $r_t$ is generated.

A shaft 82 is adjusted by a follow-up motor $NM_3$ to an angular position which corresponds to the value $r_t$. This is effected in the following way:

The shaft 82 controls a multiplication member $P1_2''$ to which a unit voltage 1 is supplied. Accordingly it generates a voltage $$r_t^*$$

which by a phase reversing member $P6_2$ is converted into the value $$-r_t^*$$

An addition member $P4_4''$ receives as input voltages the values $r_t$ from $P1_1''$ and $$-r_t^*$$

from $P6_2$ and its output voltage which should assume the value zero, is supplied via the amplifier $V_3$ to the follow-up motor $NM_3$, so that the shaft 82 is forcibly adjusted to the correct value $r_t$. By the shaft 82 moreover a multiplication member $P7$ is controlled which is adjusted to the function $t/r_t$ and which is supplied with the voltage $r_t/r_m$ so that it generates a voltage $t/r_m$ which is supplied to the members $P8_1$, $P8_2$ and $P8_3$ for the production of the voltages $\Delta x/r_m$, $\Delta y/r_m$ and $\Delta z/r_m$, respectively.

The value $r_t$ of the shaft 82 is transferred via the bevel gearing 83 and the shaft 84 to the indicating instrument 81.

The deviation angle $\Delta\alpha$ which corresponds to the angular position of the shaft 62 is added to the angle $\alpha_m$ of the shaft 34 in the summation mechanism 65, and this sum is transferred via the shaft 66 to the indicating instrument 61 for the angle $\alpha_t$.

Likewise the angle difference $\Delta\lambda$ is added from the shaft 52 via a summation mechanism 55 to the value $\lambda_m$ of the shaft 24, and this sum is transmitted via the shaft 56 to the indicating instrument 51 for the angle of elevation $\lambda_t$.

The advantages of this embodiment reside in the first place in, that the relative magnitudes of the values $\Delta x/r_m$, $\Delta y/r_m$, $\Delta z/r_m$, $B/r_m$, $A/r_m$, $D/r_m$, $C/r_m$, $\Delta r_1/r_m$ and $r_t/r_m$ are variable within considerably narrower limits than the corresponding absolute values, as used in the embodiment according to Fig. 5. Therefrom result considerably smaller absolute errors than in the embodiment according to Fig. 5.

With reference to Fig. 11, the internal construction of the linear multiplication members P1 (i.e. P1 with respectively varying suffixes) as used in the devices according to Figs. 2, 5, 8 and 10, will be described below.

An adjustment shaft 100 is provided over part of its length with a right hand thread 101, and over an equally long part with a left hand thread 102. Each threaded portions is in engagement with a nut 103, 104, respectively, which is restrained from rotating. Each of these nuts carries a sliding contact 105, 106, respectively which together with an associated resistance 107, 108, respectively, forms a voltage divider. Between the conductors 109 which are connected to the A.C. mains there exists an input alternating voltage of the value $e1$, and since the inner ends of the resistances 107, 108 are connected with one another and are grounded, there is between the conductors 110 which are provided with the said sliding contacts a symmetrical alternating voltage $a1$ of the same frequency and phase relation as that of the input alternating voltage $e1$, the magnitude of which voltage $a1$ is however dependent on the position of the sliding contacts on the associated resistances, i.e. on the angular position of the shaft 100. The appliance can be easily constructed in such a manner that the voltage $a1$ complies with the condition:

$$a1 = e1.\epsilon1$$

in which $\epsilon1$ denotes the angular position of the shaft 100, which is proportional to a certain physical parameter, for example to the distance $r_m$.

A component analyser P2 (indicated in Figs. 2, 5, 8, 10, respectively as P2 with added suffixes) consists according to Fig. 12 of a stationary coil 111 which is magnetically coupled with two coils 112, 113 which are mounted perpendicular to one another on a disc 114, which is controlled by an adjustment shaft 115 in dependence of a variable adjustment angle $\epsilon2$.

In goniometer appliances of this kind the output voltages $a2_1$ of the coil 112 and $a2_2$ of the coil 113 fulfil the following conditions:

$$a2_1 = e2.\sin \epsilon2$$
$$a2_2 = e2.\cos \epsilon2$$

in which $e2$ denotes the alternating voltage applied to the coil 111, and $\epsilon2$ denotes the adjustment angle to which the disc 114 and shaft 115 are adjusted.

Figure 13:
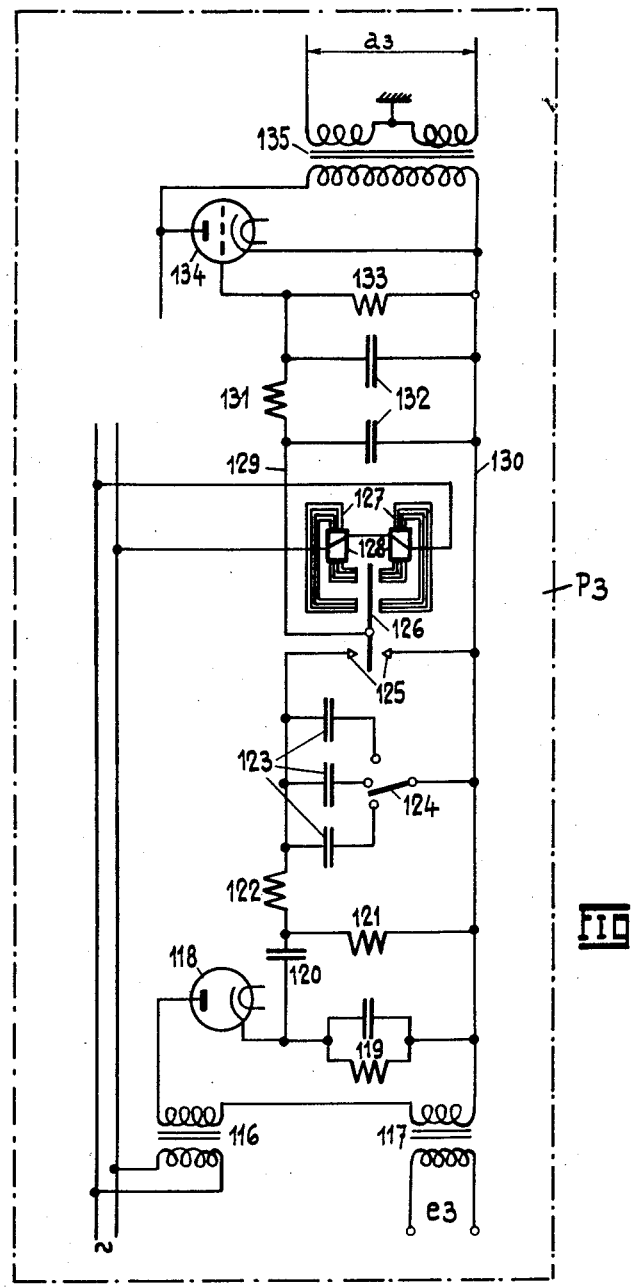
Fig. 13 shows a differentiation— and damping— member P3 as used in the embodiments of Figs. 2, 5 and 8.

A differentiating member P3 (indicated in Figs. 2, 5, 8, respectively, as P3 with added suffixes) as represented in Fig. 13 has two A.C. transformers 116 and 117. The primary coil of the transformer 116 is supplied from the A.C. mains with an alternating voltage of permanent amplitude, and to the primary coil of the transformer 117 in alternating voltage of variable amplitude $e3$ of equal frequency is applied, which is to be differentiated. The two secondary coils are connected in series with one another and the anode of a diode valve 118 is connected to the secondary coil of the transformer 116. Between the cathode of this diode valve and the free end of the secondary coil of the transformer 117 a resonance circuit 119 formed by the arrangement in parallel of a resistance and of a condenser is interposed on which a variable D.C. voltage is generated, the magnitude of which is proportional to the momentary amplitude of the input voltage $e3$.

This variable D.C. voltage is then differentiated with respect to time by a differentiation arrangement which consists of a condenser 120 and a resistance 121 arranged in series. The D.C. voltage which is formed across the resistance 121 and which corresponds to the term $de3/dt$ is supplied to a smoothing circuit, which is formed by a resistance 122 and one of the condensers 123 which may be selected by adjusting the selector switch 124, and which in conjunction with the resistance 122 yields a suitable time constant.

In the current determination of the values $r_m$, $\alpha_m$, $\lambda_m$ errors in measurement are not entirely avoidable, so that the magnitude of the differentiated voltage across the resistance 121, which corresponds to a velocity component $\dot{x}_m$, $\dot{y}_m$, $\dot{z}_m$, fluctuates even when the target moves at uniform velocity on a straight path. By suitable choice of the time constant through adjustment of the selector switch 124 to a suitable condenser 123, these errors can be corrected though, so that the voltage across the stationary contacts 125 corresponds to the correct magnitude of velocity $v_x$, $v_y$, $v_z$. Between these contacts an armature 126 oscillates at the frequency of the mains owing to being energized by the poles of a magnet core 127, the exciter coils 128 of which are connected to the A.C. mains. Between the conductors 129 and 130 accordingly a trapezoidal pulsating A.C. voltage is generated the basic frequency of which conforms with the frequency of the mains. The superimposed frequencies are filtered off by a filter-circuit which is formed by a series resistance 131 and the two transverse capacities 132 so that on the resistance 133 an A.C. voltage is produced, the amplitude of which is proportional to the velocity component $v_x$, $v_y$, $v_z$ to be determined, and is amplified by an amplifier valve 134. The output voltage of this amplifier valve is applied to the primary coil of a transformer 135 and is symmetrically split in the subdivided secondary coil thereof. The output A.C. voltage $a3$ of the differentiating member as a whole corresponds accordingly to the condition $a3 = de3/dt = \dot{e}3$.

Naturally means of another kind, known per se, could be used for converting the D.C. voltage between the contacts 125 into A.C.

An addition member P4 (indicated in Figs. 2, 5, 8, 10, respectively as P4 with added suffixes) as illustrated in Fig. 14 is supplied with the two input A.C. voltages $e4_1$ and $e4_2$ from which an output A.C. voltage $a4 = e4_1 + e4_2$ should be formed. This addition member comprises three pairs of fixed resistances 136, 137, 138 which are connected each between two of three pairs of terminals 139, 140, 141, respectively. In order to attain from input voltages $e4_1$ and $e4_2$ which are symmetrical in relation to ground an output voltage which is likewise symmetrical to ground, the resistances of each pair are equal to one another. Besides they are so dimensioned that the ratio between the voltages appearing at the pairs of terminals 139 and that between the voltages appearing at 141, and pairs of terminals 140 and 141, respectively, are equal to one another, while the effect of the pair of resistances 138 between the pairs of terminals 139 and 140 is such that the whole device prevents the input voltages $e4_1$ and $e4_2$ from mutually influencing one another while being added up to form an output voltage $a4$.

In Fig. 15 a first embodiment of an eight-pole transformation member P5 (indicated in Figs. 2, 5, 8, 10, respectively, as P5 with added suffixes) is represented as used repeatedly in the embodiments of the invention described above.

It has four pairs of terminals, which are denoted 151, 152, 153, 154, respectively. Between any two pairs of terminals a four-pole interposed, namely between the pairs of terminals 151—153 the four-pole 155, between the pairs of terminals 151—154 the four-pole 156, between the pairs of terminals 152—153 the four-pole 157, and between the pairs of terminals 152—154 the four-pole 158.

Each of the four-poles consists of a cross member with four adjustable resistances. All the resistances are controlled by the adjustor shaft 150. The angular position of the shaft 150 corresponds to a variable adjustment angle $\epsilon 5$. The pair of terminals 151 is supplied with the input A.C. voltage $e5_1$, the pair of terminals 152 with the input A.C. voltage $e5_2$. On the pair of terminals 153 the output A.C. voltage $a5_1$, and on the pair of terminals 154 the output voltage $a5_2$ are to be formed.

It is assumed, that the internal resistances of the sources of the voltages $e5_1$ and $e5_2$ remain constant, and also that the members connected to the pairs of terminals 153 and 154 each form a constant blocking resistance, so that the potential transformation factors arising between the individual pairs of terminals are dependent merely on the angular position $\epsilon 5$ of the shaft 150.

The four cross members are so constructed that the transformation factors between the pairs of terminals are:

*Transformation factor*

$151 \leftrightarrows 152 = 0$
$151 \rightarrow 153 = \cos \epsilon 5$
$151 \rightarrow 154 = \sin \epsilon 5$
$152 \rightarrow 154 = \cos \epsilon 5$
$152 \rightarrow 153 = -\sin \epsilon 5$
$153 \leftrightarrows 154 = 0$ Accordingly neither the input voltages $e5_1$ and $e5_2$ mutually influence one another nor the output voltages $a5_1$ and $a5_2$, while the output voltages fulfill the following conditions:

$$a5_1 = e5_1 \cos \epsilon 5 - e5_2 \sin \epsilon 5$$
$$a5_2 = e5_1 \sin \epsilon 5 + e5_2 \cos \epsilon 5$$

In order that all the voltages remain symmetrical, the cross members 155—158 are so constructed that in any angular position of the shaft 150 the two series resistances remain equal to one another, likewise the two transverse resistances remain equal to one another.

Transformation eight-poles of a different kind have become known which are built-up from inductively coupled elements. In one known embodiment of this kind the two input voltages are supplied to two stator coils which are offset 90° to one another. From two rotor coils likewise off-set 90° the output voltages can then be taken off.

Figure 16:
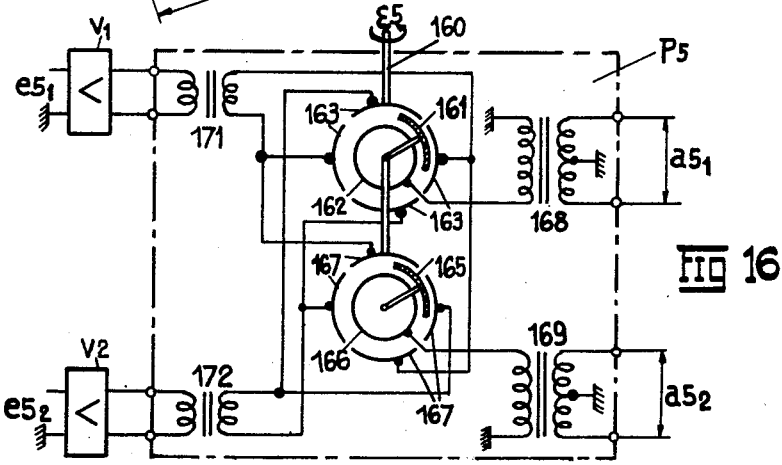
Fig. 16 shows an alternative embodiment of an eight-pole resolving means P5.

In Fig. 16 a new eight-pole resolving member is represented which fulfils the same conditions.

Here the shaft 160, the angular position of which corresponds to an angle $\epsilon 5$, controls two sector shaped rotors each of which consists of dielectric plates 161, 165, respectively. The rotor 161 belongs to a condenser having one annular, one-piece plate 162, whereas the opposite plate consists of four separate, sector shaped sections 163.

The capacity acting between the plate 162 and any one of the sectors 163 of the opposite plate is an unequivocal function of the angular position of the shaft 160.

In a like manner the rotor 165 cooperates with a variable condenser comprising the annular plate 166 and the opposite four plate sections 167. The input voltage $e5_1$ is applied to the primary coil of a transformer 171, the secondary coil of which is connected to one pair of diametrically opposite sections 163 of the condensers 161, 162, 163 and one diametrically opposite pair of sections 167 of the condensers 165, 166, 167.

Likewise the input voltage $e5_2$ is applied to the primary coil of a transformer 172 the secondary coil of which is connected to the remaining pairs of diametrically opposed sections 163, 167 of the two condensers, respectively which are offset 90° against those pairs which are connected to the secondary coil of the transformer 171 as described hereinabove. The pairs of sections connected to the transformer 171 are respectively offset 90° in the two condensers, and likewise those pairs of sections which are connected to the transformer 172 in the two condensers are respectively offset 90° to one another, assuming the dielectric plates 161, 165 having identical angular positions in both condensers.

The condenser plates 162 and 166, respectively are connected to the primary coils, grounded at their opposite ends, the transformers 168, 169, respectively, so that on their secondary coils which are through a center tap symmetrical with respect to ground, the output voltages $a5_1$ and $a5_2$ are formed which comply with the requirements $$a5_1 = e5_1 \cos \epsilon 5 - e5_2 \sin \epsilon 5$$
$$a5_2 = e5_1 \sin \epsilon 5 + e5_2 \cos \epsilon 5$$

since as stated the pair of plate sections of the second condenser, which are connected to the secondary coil of the transformer 171, are offset 90° with respect to the pair of plate sections of the first condenser, which are connected to the same coil 171, and since likewise the plate sections connected to the transformer 172 of the first condenser are offset 90° with respect to the plate sections of the second condenser which are connected with the same coil.

Since in the resolving appliance P5 described hereinabove the conductors connected to the primary coils of the transformers 171 and 172 are not uncoupled from one another, the corresponding input impedances for the various positions of the shaft 160 are not constant. In order to be able to block the respectively preceding four-poles with a constant impedance, amplifiers $V_1$ and $V_2$ are additionally arranged ahead of the transformers 171 and 172. By this interposition of amplifiers it is further achieved that the voltages $e5_1$ and $e5_2$ need not be symmetrical, since the output voltages on the secondary coils of the transformers 168 and 169 are in any case symmetrical.

Figure 17:
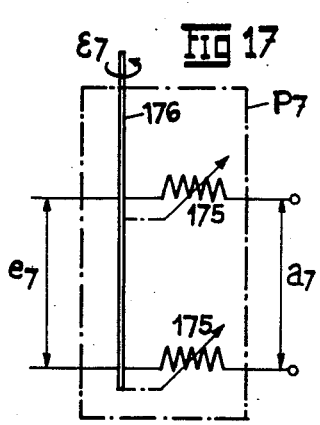
Fig. 17 shows the internal construction of a non-linear multiplication member P7, which is used in the embodiments of the Figs. 2, 5, 8 and 10.

A multiplication member P7 (indicated in Fig. 8 as P7 with added suffixes) according to Fig. 17 is distinguished in principle from the member P1 according to Fig. 11 therein only that it does not multiply an input voltage e7 by a linear function of the angular position $\epsilon 7$ of the shaft 176 but with any non-linear function $f(\epsilon 7)$ so that the output voltage $a7=e7.f(\epsilon 7)$ results. This function may be for example $r_t(t)$ wherein the parameter $t=\epsilon 7$ denotes the time of flight of a projectile to the striking point, and $r_t=f(t)$ is the corresponding distance of flight. When the variable resistances 175 of the four-pole P7 vary according to this function, the said four-pole P7 can be supplied with a constant input voltage, and upon adjustment of the shaft 176 in linear function of the time value $t$ the corresponding value of the distance $r_t=f(t)$ is found. On the other hand, the resistances 175 could be adjusted alternatively to the function $t=f'(r_t)$ in which case the shaft 176 is turned in dependence of a flight distance $r_t$, and the output voltage a7 fulfils the condition $$a7=e7.t=e7.f'(r_t).$$

The resistances 175 could, according to another alternative, be so dimensioned that the output voltage a7 resulting as a function of the angular position $\epsilon 7 = r_t$ of the shaft fulfils the condition $$a7=(t/r_t)e7$$

as used in Fig. 10.

Figure 18:
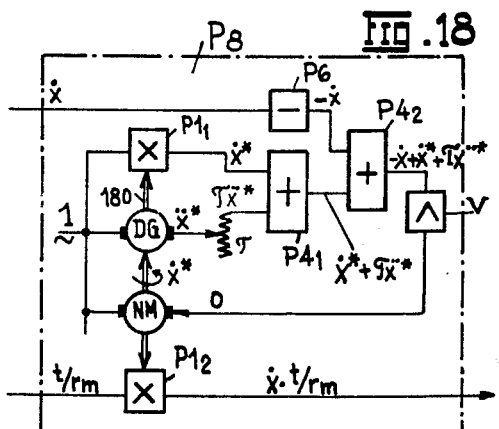
Fig. 18 shows in diagrammatical representation the construction of a computing member P8, as used in the embodiment of Fig. 10.

The construction of a computing member indicated as P8 with added suffixes in the embodiment of Fig. 10 is diagrammatically illustrated as P8 in Fig. 18.

A voltage proportional to the velocity component $\dot{x}$ is converted into the value $-\dot{x}$ in a phase reversing member P6. A shaft 180 drives a multiplication member $P1_1$ which is supplied with a unit A.C. voltage 1 from the A.C. mains and which generates a voltage $\dot{x}^*$ which is to be made equal to value $\dot{x}$. Accordingly the angular position of the shaft 180 ought to be likewise proportional to the value $\dot{x}^*$. A Tachometer-Generator D.G. an embodiment of which will be described later with reference to Fig. 20 and which is supplied with the voltage 1 from the mains and the rotor of which is mounted on the shaft 180 generates a voltage which is proportional to the speed of rotation of the shaft 180, i.e. it corresponds to the value $$\ddot{x}^*$$

This voltage $$\ddot{x}^*$$

is passed over an adjustable damping resistance $\tau$ so that a voltage $$\tau\ddot{x}^*$$

results which in the addition member $P4_1$ is added to the value $\dot{x}^*$. The sum $$\dot{x}^*+\tau\ddot{x}^*$$

is added in the addition member $P4_2$ to the voltage $-\dot{x}$ so that a voltage is obtained which is proportional to the difference $$(\dot{x}^*+\tau\ddot{x}^*)-\dot{x}$$

and which is supplied via an amplifier V to the follow-up motor NM, which adjusts the shaft 180 automatically to that angular position $\dot{x}^*$ which corresponds to the value $\dot{x}$ so that the aforesaid voltage difference assumes the value zero. The influence of the component $$\ddot{x}^*$$

can be reduced by increasing the damping resistance $\tau$ so that damping errors in the determination of the value $\dot{x}$ can be thereby compensated. Any follow-up control by the aid of a follow-up motor can be rendered aperiodic by means of a Tachometer-Generator D.G. driven by the shaft of the follow-up motor.

The shaft 180, which accordingly assumes an angular position corresponding to the value $\dot{x}$, adjusts a multiplication member $P1_2$, which as indicated in Fig. 10 is supplied with a voltage $t/r_m$ and which accordingly generates a voltage which is proportional to the product $\dot{x}.t/r_m$.

The device according to Fig. 18 has the object of generating and amplifying a voltage of the form $$(\dot{x}^*+\tau\ddot{x}^*)-\dot{x}_m$$

In Fig. 8 a similar arrangement comprising the two addition members $P4_6$ and $P4_7$ as well as the amplifier $V_2$ serves for producing a voltage of the form $$\dot{z}_i^* -(\Delta z+z_m)$$

This task can be easily fulfilled by means of a computing member according to Fig. 19. It has three transformers 191, 192 and 193, the primary coils of which are supplied with the voltages $-e9_1$, $e9_2$ and $e9_3$.

Their secondary coils lie in series arrangement in the grid circuit of the amplifier valve 194, the cathode resistance of which is denoted 195. In its anode circuit there are arranged in series the primary coil of a transformer 196 and a D.C. voltage source 197, so that on the secondary coil of the transformer 196 an output voltage is generated which complies with the conditions required.

According to Fig. 20 a Tachometer-Generator, the rotor of which is denoted 200, has two stator coils 201 and 202. The coil 201 is supplied with an A.C. voltage e20, and the rotor 200 is driven by a shaft the angular position of which corresponds to a value $\epsilon 20$.

The speed of rotation of this shaft, i.e. of the rotor 200, corresponds to the value $$\dot{\epsilon}20=d\epsilon 20/dt$$

The output voltage a20 across the coil 202 then corresponds in magnitude and phase to the product $$e20.\dot{\epsilon}20$$

According to Fig. 21 the follow-up motor NM is provided with two stator coils 211 and 212, of which the coil 211 is connected to the A.C. mains i.e. is under a constant voltage amplitude, while the other stator coil 212 is supplied with a variable voltage e21. The rotor 210 of the follow-up motor turns in dependence of the magnitude and phase position of the voltage across the coil 212 in respect of the voltage across the coil 211. Accordingly the shaft, on which the rotor 210 is mounted, is turned at a speed $\dot{2}1=c. e21$ in dependence of the magnitude and phase position of the voltage across the coil 212.

Obviously the computing members according to Figs. 11–21 could be replaced by differently constructed computing members which perform the same functions. Likewise, several computing members could be combined into units as described with reference to Fig. 19.

It deserves to be particularly mentioned that in all embodiments of the device according to the invention means are provided which, by introducing a variable damping, allow the compensation of errors in the measurement of the values $r_m$, $\alpha_m$ and $\lambda_m$ which damping is effected according to the Figs. 2, 5 and 8 when determining the velocity components $v_x$, $v_y$, $v_z$ in the differentiation members P3 by introducing a variable time constant, whereas according to the embodiment according to Fig. 10 this damping is effected in the computing members P8 by the variable resistance $\tau$.

Moreover it is possible without any difficulty to make the embodiments according to the Figs. 5 and 8, too, in such a manner that at least part of the voltage values coming into effect correspond to a unit distance such as $r_m=1$, as according to Fig. 10.

In all three embodiments described an additional angle $\delta$ can be formed in a manner known per se. For example an appliance can be provided which comprises a cam body and a feeler, the said cam body being turned by a shaft in dependence of the distance $r_t$, while the feeler is shifted along the cam body by the shaft 56. The distance of the feeler from the axis of rotation of the cam body forms a measure for the additional angle which has to be added to the angle at which the gun is to be laid. By means of a summing mechanism this additional angle can be added to the angular position $\lambda_t$ of the shaft 56.

In many cases it suffices to determine the time value $t$ not in dependence of the distance $r_t$ of the striking point T but in dependence of the distance $r_m$ of the target point M, as is the case in many firing control devices of a known type. Since the difference is small in comparison with the absolute values $r_t$ and $r_m$, the approximate deviation components $x$, $y$, $z$ then ascertained may be sufficiently accurate in certain conditions.

It is not necessary to adjust the shafts 11, 21, 31 by means of manually operated cranks 10, 20, 30 in accordance with values read off by the operator. These shafts could be adjusted automatically by means of the usual follow-up mechanisms in dependence of the magnitudes $r_m$, $\lambda_m$, $\alpha_m$ currently measured with the aiming device.

While I have described and illustrated what may be considered typical and particularly useful embodiments of my said invention, I wish it to be understood that I do not limit myself to the particular details described and illustrated, for obvious modifications will occur to a person skilled in the art.

What I claim as my invention and desire to secure by Letters Patent, is:

1. Apparatus for automatically determining the polar coordinates $r_t$, $\lambda_t$ and $\alpha_t$ of an intersecting point T of a projectile with the trajectory $k$ of a target M moving in space, wherein $r_t$ is the polar distance, $\lambda_t$ is the angle of elevation and $\alpha_t$ is the azimuth angle of the point T with respect to the release point of the projectile, comprising in combination, three adjustment shafts arranged for turning movement proportional to the continuously varying polar coordinates $r_m$, $\lambda_m$ and $\alpha_m$, where $r_m$ is the polar distance, $\lambda_m$ is the angle of elevation and $\alpha_m$ is the azimuth angle of the target M with respect to said release point of the projectile;

a plurality of first computing means for producing first electrical output signals and auxiliary electrical signals, said first output signals being proportional to the velocity components of the moving target M in Cartesian coordinates with respect to a fixed system of such coordinates, said velocity components being respectively $\dot{x}_m$, $\dot{y}_m$, $\dot{z}_m$, a plurality of said first computing means being each respectively connected to one of said adjustment shafts and controlled by the same, said auxiliary electrical signals being proportional to the polar distance $r_m$ and to the horizontal projection thereof $r_{m1}$, respectively; a plurality of second computing means responsive to said first electrical output signals and to a signal proportional to the time of flight, and for producing by multiplication second electrical output signals proportional to the Cartesian deviation components $\Delta x = \dot{x}.t$; $\Delta y = \dot{y}.t$; and $\Delta z = \dot{z}.t$, wherein $\dot{x}$, $\dot{y}$ and $\dot{z}$ are projectile velocity components appearing in the directions of the Cartesian coordinates and wherein $t$ is the time of flight of the projectile from the release point thereof to the intersecting point T and therefore a function of the polar distance $r_t$; a plurality of third computing means comprising a first resolving means responsive to said adjustment shaft displacement representing $\alpha_m$ and to said second electrical output signals proportional to $\Delta x$ and $\Delta y$ to produce signals proportional to Cartesian deviation components transformed by rotation of the axes by $\alpha_m$; first summing means responsive to said auxiliary signal proportional to $r_{m1}$ and to said signal proportional to the transformed abscissa deviation component to produce a signal proportional to the sum of the inputs; a first arc-tangent resolver means responsive to the output of said first summing means and to said signal proportional to the transformed ordinate deviation component to produce a first control shaft displacement proportional to the turning angle $\Delta\alpha$ and a signal proportional to the polar distance $r_{t1}$; subtracting means responsive to said signal proportional to $r_{t1}$ and to said auxiliary signal proportional to $r_{m1}$ to produce a signal proportional to the difference $\Delta r_1$ of the inputs; second resolving means responsive to said signal proportional to $\Delta r_1$, to said second electrical output signal proportional to $\Delta z$ and to said adjustment shaft displacement representing $\lambda_m$ to produce signals proportional to the deviation components transformed by a rotation of the axes by $\lambda_m$; second summing means responsive to said auxiliary signal proportional to $r_m$ and to said signal proportional to the transformed abscissa deviation component to produce a signal proportional to the sum of the inputs; a second arctangent resolver responsive to the output of said second summing means and to said signal proportional to the transformed ordinate deviation component to produce a second control shaft displacement proportional to the turning angle $\Delta\lambda$ and to a signal proportional to the polar distance $r_t$, and time of flight computing means responsive to said electrical output signals for producing a signal proportional to time of flight;

and means operatively connecting said control shafts and two of said adjustment shafts for totalizing the azimuth angles $\Delta\alpha$ of one of said control shafts and the azimuth angle $\alpha_m$ of one of said adjustment shafts to produce the azimuth angle $\alpha_t$, and for totalizing the elevational angle $\Delta\lambda$ of the other one of said control shafts and the elevational angle $\lambda_m$ of the other one of said adjustment shafts for producing the elevational angle $\lambda_t$ of the intersecting point T with respect to said release point of the projectile.

2. A device as claimed in claim 1 wherein said plurality of third computing means comprises at least one eight-pole resolving means and one amplifier in circuit therewith, said eight-pole resolving means being operatively connected to one of said control shafts for being adjusted to an angle $\epsilon$ thereby and being electrically connected to other ones of said computing means for being supplied with two input voltages $e1$ and $e2$ thereby, said eight-pole resolving means being responsive to said input voltages $e1$ and $e2$ to generate two output voltages $$a1 = e1.\cos\epsilon - e2.\sin\epsilon$$
and
$$a2 = e1.\sin\epsilon + e2.\cos\epsilon$$

the input side of the said amplifier being electrically connected to the output of said eight-pole resolving means for being supplied with said output voltage $a1$ thereby, and a follow-up motor electrically connected to the output side of said amplifier and being geared to said one of said control shafts, whereby said output voltage $a1$ is equalized to zero.

3. A device as claimed in claim 2, comprising in addition: a summation mechanism having one input shaft geared to the said adjustment shaft whose position represents the azimuth angle $\alpha_m$ of the target M and a second input shaft geared to said control shaft of that member of said third computing means the angular position of which is proportional to the said azimuth deviation angle $\Delta\alpha$; a second summation mechanism having one input shaft geared to the said adjustment shaft whose position represents the angle of elevation $\lambda_m$ of the target M and a second input shaft geared to said control shaft of that member of said third computing means the angular position of which is proportional to said deviation $\Delta\lambda$ of the angle of elevation.

4. A device as claimed in claim 3 comprising electrical addition members electrically respectively connected to said second computing means for adding voltages proportional to the parallax distances $x_0$, $y_0$, $z_0$ of the starting point of the projectile from the zero point of the coordinate system constituting the observation point for the target, to the voltages generated in the said second computing means respectively proportional to said deviation components $\ddot{x}_m.t$, $\ddot{y}_m.t$, $\ddot{z}_m.t$.

5. A device as claimed in claim 4 said plurality of third computing means comprising a second eight-pole resolving means and a second amplifier, the said second eight-pole resolving means being operatively connected to one of said control shafts for being adjusted thereby to an angle $\Delta\alpha$ and being electrically connected to another one of said third computing means for being supplied thereby with two input voltages $(\Delta y \cos \alpha_m - \Delta x \sin \alpha_m)$ and $(\Delta y \sin \alpha_m + \Delta x \cos \alpha_m + r_m \cos \lambda_m)$, the said second eight-pole resolving means generating two output voltages $(\Delta y.\cos \alpha_m - \Delta x.\sin \alpha_m).\cos \Delta\alpha$
$\quad -(\Delta y.\sin \alpha_m + \Delta x.\cos \alpha_m + r_m.\cos \lambda_m).\sin \Delta\alpha$
and $(\Delta y.\cos \alpha_m - \Delta x.\sin \alpha_m).\sin \Delta\alpha$
$\quad +(\Delta y. \sin \alpha_m + \alpha x.\cos \alpha_m + r_m.\cos \lambda_m).\cos \Delta\alpha$ the input side of the said second amplifier being electrically connected to the output of said second eight-pole resolving means for being supplied thereby with the first one of the said output voltages thereof, and a follow-up motor electrically connected to the output of said second amplifier and being geared to said control shaft, whereby the said first output voltage of said second eight-pole resolving means is equalized to zero and said control shaft is adjusted by said follow-up motor automatically to an angular position corresponding to the azimuth deviation angle $\Delta\alpha$, the second output voltage of said second eight-pole resolving means becoming proportional to the distance $r_{t1} = r_t.\cos \lambda_t$.

6. A device as claimed in claim 5 wherein said plurality of second computing means comprises three electrical multiplication members, an additional control shaft operatively connected with said multiplication members for adjusting the latter to an angle proportional to the time of flight $t$ of the projectile, an electrical ballistic computing member operatively controlled by said additional control shaft to generate a voltage $r_i^*$ proportional to the firing range; and wherein said plurality of third computing means comprises an electrical addition member electrically connected to the output of the said ballistic computing member and to another computing one of said third computing means for being supplied by said ballistic computing member with said voltage $r_i^*$ and by said computing means with an auxiliary signal, negatively proportional to a distance value $r_t$, said addition member being responsive thereto by producing an output voltage equal to $r_i^* - r_t$ an additional amplifier having its input electrically connected to the output of said addition member, and a follow-up motor $NM_3$ electrically connected to the output of said additional amplifier and having its shaft geared to the said additional control fourth adjustment shaft for adjusting the same to an angular value $t$ for which the said voltage difference $r_i^* - r_t$ is 0 whereby the voltages generated by the said three electrical multiplication members of said plurality of second computing means become proportional to the values $\ddot{x}_m.t$, $\ddot{y}_m.t$ and $\ddot{z}_m.t$, respectively.

7. A device as claimed in claim 6 wherein said plurality of third computing means comprises a third eight-pole resolving means electrically connected to other ones of said third computing means and for being supplied thereby with a voltage proportional to $(\Delta z.\cos \lambda_m - \Delta r_1.\sin \lambda_m)$ and to still other ones of said third computing means for being supplied thereby with a voltage proportional to $(\Delta z.\sin \lambda_m + \Delta r_1.\cos \lambda_m + r_m)$, said third eight-pole resolving means being controlled by said control shaft whose displacement is proportional to the angle $\Delta\lambda$ so that said third eight-pole resolving means generates two output voltages $(\Delta z.\cos \lambda_m - \Delta r_1.\sin \lambda_m).\cos \Delta\lambda$
$\quad -(\Delta z.\sin \lambda_m + \Delta r_1.\cos \lambda_m + r_m).\sin \Delta\lambda$
and $(\Delta z.\cos \lambda_m - \Delta r_1.\sin \lambda_m).\sin \Delta\lambda$
$\quad +(\Delta z.\sin \lambda_m + \Delta r_1.\cos \lambda_m + r_m).\cos \Delta\lambda$ a third amplifier having its input side electrically connected to one output of the said third eight-pole resolving means for being supplied thereby with the first one of said last mentioned output voltages thereof; a follow-up motor electrically connected to the output side of the said third amplifier and geared to said control shaft associated with said angle $\Delta\alpha$ for adjusting the same to that angular position which corresponds to the value of $\Delta\lambda$ for which the said first one of said last mentioned output voltages of the said third eight-pole resolving means assumes the value of zero, the second one of said last mentioned output voltages thereof then being proportional to the distance value $r_t = OT$ and means for supplying said second one output voltage $r_t$ to a computing means of the said plurality of second computing means for determining the time value $t$ of the time of flight of the projectile.

8. A device as claimed in claim 7, wherein said plurality of third computing means said first eight-pole resolving means is electrically connected to computing means of said plurality of second computing means for being supplied thereby with voltages proportional to the Cartesian deviation components $\Delta x = x_t - x_m$ and $\Delta y = y_t - y_m$ respectively, said first resolving means being controlled by said control shaft whose displacement represents the azimuth angle $\alpha_m$ of the target M, so as to produce two output voltages proportional to the values $B = \Delta y.\cos \alpha_m - \Delta x.\sin \alpha_m$
and $A' = \Delta y.\sin \alpha_m + \Delta x.\cos \alpha_m$ said second eight-pole resolving means being electrically connected to said first eight-pole resolving means and to another computing means of said plurality of second computing means for being supplied thereby with two input voltages proportional to said value $B$ and to a value $A = A' + r_m \cos \lambda_m$ respectively, and being controlled by said control shaft whose displacement represents the azimuth deviation angle $\Delta\alpha$ so that said second eight-pole resolving means generates two output voltages proportional to the values $B.\cos \Delta\alpha - A.\sin \Delta\alpha = 0$
and $B.\sin \Delta\alpha + A.\cos \Delta\alpha = r_{t1}$ said third eight-pole resolving means being electrically connected to another computing means of said plurality of second computing means for being supplied thereby with a voltage proportional to the Cartesian deviation component $\Delta z = z_t - z_m$, and to a computing means of said plurality of first computing means for being supplied thereby with a voltage proportional to the polar deviation $\Delta r_1 = r_{t1} - r_m \cos \lambda_m$ and being controlled by said control shaft whose displacement represents the elevation angle $\lambda_m$ of the target M, so that said third eight-pole resolving means generates two output voltages proportional to the values $$D = \Delta z \cos \lambda_m - \Delta r_1 \sin \lambda_m$$

and $$C' = \Delta z \sin \lambda_m + \Delta r_1 \cos \lambda_m$$

a fourth eight-pole resolving means electrically connected to said third eight-pole resolving means and to another computing means of said plurality of first computing means for being supplied by them with the input voltages proportional to the values D and $C' + r_m$, a follow-up motor having a control shaft for controlling the said fourth eight-pole resolving means and being electrically connected to the output thereof and for being supplied thereby with a first voltage proportional to the value $D.\cos \Delta\lambda - C.\sin \Delta\lambda$ whereby said last mentioned follow-up motor adjusts its associated control shaft to an angular value $\Delta\lambda$ for which the said first output voltage of the said fourth eight-pole resolving means becomes zero while the second output voltage $D \sin \Delta\lambda + C \cos \Delta 2$ becomes proportional to the flight distance $r_t$.

9. A device as claimed in claim 5 comprising a fifth control shaft geared to one of said follow-up motors for being adjusted thereby to an angle proportional to the polar deviation $\Delta r = r_t - r_m$, said plurality of second computing means comprising an addition member electrically connected to another computing means of said plurality of second computing means for being supplied thereby with a voltage proportional to said Cartesian deviation component $\Delta z$, and electrically connected to a computing means of said plurality of first computing means for being supplied thereby with a voltage proportional to the Cartesian coordinate $z_m$ of the target M, so that said addition member of said plurality of second computing means generates a voltage proportional to the value $z_t = z_m + \Delta z$; said plurality of third computing means comprising eight-pole resolving means controlled by that one of said control shafts the displacement of which represents the azimuth deviation angle $\Delta\alpha$ and electrically connected to other computing means of said plurality of third computing means for being supplied by them with input voltages proportional to said Cartesian deviation components $\Delta x$ and $\Delta y$, so as to generate an output voltage proportional to the said distance value $r_{t1}$; a third eight-pole resolving means controlled by that one of said control shafts the displacement of which represents said deviation angle of elevation $\Delta\lambda$ and electrically connected to two computing means of said plurality of first computing means for being supplied by them with input voltages proportional to the said values and $$z_m + \Delta r \sin \lambda_m z_t{}^*$$

$$(r_m + \Delta).\cos\lambda_m r_{t1}{}^*$$

respectively, so that said third eight-pole resolving means generates output voltages proportional to the values $z_t$ and $r_{t1}$ respectively; one of the said follow-up motors being electrically connected to both the said last mentioned eight-pole resolving means for being supplied with the difference of the voltages $z_t$ generated by them in different ways and being geared to the said control shaft controlling the said second eight-pole resolving means, said follow-up motor geared to said fifth control shaft being in circuit with both said last mentioned eight-pole resolving means for being supplied by them with the difference of the voltages $r_{t1}$ generated by them in different ways.

10. A device as claimed in claim 9 comprising a summation gearing having said fifth control shaft and said adjustment shaft turning proportionally to said polar distance $r_m$ of the target M as input shafts and having an output shaft responsive to the angular displacements of said input shafts by assuming an angular position proportional to said polar distance $r_t$ of the striking point T, an additional control shaft being geared to said output shaft for being adjusted thereby to an angle proportional to the time value $t$, of the time of flight $t$ of the projectile; ballistic computing members electrically connected to computing of said plurality of first computing means for being supplied by them with voltages proportional to the velocity components $\dot{x}_m, \dot{y}_m, \dot{z}_m$ respectively, and controlled by said additional control shaft for multiplying said velocity components respectively, with said time value $t$.

11. A device as claimed in claim 1, wherein said plurality of first computing means comprises differentiation members electrically connected to other computing means of said plurality of first computing means for being supplied by them with alternating voltages proportional to the said Cartesian coordinates $x_m, y_m, z_m$ of the target M, each of said differentiation members including in series a rectifier stage, a differentiation stage and converter means reconverting the direct current voltages generated by said rectifier stage and differentiating stage corresponding to the differential quotient with respect to time of said Cartesian coordinates into alternating voltages respectively proportional to the Cartesian velocity components $\dot{x}_m, \dot{y}_m, \dot{z}_m$ of said target M.

12. A device as claimed in claim 1, wherein said plurality of first computing means comprises differentiation members electrically connected to other computing means of said plurality of first computing means for being supplied by them with alternating voltages proportional to said Cartesian coordinates $x_m, y_m, z_m$ of the target M, each of said differentiation members including in series a rectifier stage, a differentiating stage, smoothing stage having a variable time constant and converter means reconverting the direct current voltages generated by said rectifier stage and differentiating stage corresponding to the differential quotient with respect to time of the said Cartesian coordinates into alternating voltages respectively proportional to the Cartesian velocity components $\dot{x}_m, \dot{y}_m, \dot{z}_m$ of said target M.

13. A device as claimed in claim 1, wherein said plurality of first computing means comprises three tachometer-generators driven by one of said three adjustment shafts in proportion to said polar coordinates $r_m, \alpha_m, \lambda_m$ respectively, each of the said tachometer-generators having two stator coils for generating an output voltage proportional to the differential quotients with respect to time of said polar coordinates $$\dot{r}_m, \dot{\alpha}_m, \dot{\lambda}_m$$

respectively, the said tachometer-generators being electrically connected to computing means of said plurality of third computing means for generating voltages proportional to Cartesian velocity components $\dot{x}_m, \dot{y}_m, \dot{z}_m,$ respectively, from said voltages proportional to said polar velocity components $$\dot{r}_m, \dot{\alpha}_m \text{ and } \dot{\lambda}_m$$

respectively.

14. A device as claimed in claim 1, comprising a combined computing member including three input transformers each having a primary coil supplied with an input voltage $e9_3$ $e9_2$, and $-e9_1$ respectively and having their secondary coils arranged in series, an amplifier having its input side connected to the said secondary coils, and an output transformer having a primary coil connected to the output of the said last mentioned amplifier, and generating at its secondary coil an output voltage proportional to a multiple of the sum $(e9_3 + e9_2 - e9_1)$.

15. A device as claimed in claim 1 wherein said plurality of third computing means comprises three computing means each including a follow-up motor, a shaft driven by said follow-up motor for being adjusted to an angular position $$-\overset{*}{e}8_1$$

by the same, a first multiplication member operatively connected for being adjusted by said shaft and electrically connected for being supplied with an input voltage $e8_1$, so as to generate an output voltage proportional to said angle $$\overset{*}{e}8_1$$

electrical algebraic addition means connected to the said first multiplication member and to the said follow-up motor for generating a voltage difference $$\overset{*}{e}8_1 - e8_1$$

and for supplying the same to said follow-up motor whereby the angular position $$\overset{*}{e}8_1$$

of said shaft is made proportional to said value $e8_1$, and a second multiplication member electrically connected for being supplied with said input voltage $e8_1$ and with a second input voltage $e8_2$, so as to generate an output voltage proportional to the product $e8_1 \cdot e8_2$.

16. A device according to claim 15 wherein each of the said three computing members comprises tachometer-generator driven by said shaft so as to generate an output voltage $$\dot{e}8_1$$

proportional to the speed of revolution of said shaft, and an addition member adding said output voltage $$\dot{e}8_1$$

to said output voltage $$\overset{*}{e}8_1$$

of said first multiplication member.

17. A device as claimed in claim 16, comprising a variable damping resistance electrically connected to the output side of said tachometer-generator.

18. A device as claimed in claim 1 comprising means for converting the voltage values $\Delta x$, $\Delta y$, $\Delta z$, $rm$, $rm \cdot \cos \lambda m$ to values relative to a unit distance $rm=1$, and means for supplying converted values $\Delta r/rm$, $\Delta y/rm$, $\Delta z/rm$, 1, $\cos \lambda m$, respectively to said plurality of third computing means, respectively.

References Cited in the file of this patent

UNITED STATES PATENTS

| | | |
|---|---|---|
| 2,408,081 | Lovell et al. | Sept 24, 1946 |
| 2,493,183 | Boghosian et al. | Jan. 3, 1950 |

OTHER REFERENCES

Electronic Computers, W. Shannon, "Electronics," August 1946, pages 110–113.